United States Patent
Motomura et al.

(10) Patent No.: US 7,868,925 B2
(45) Date of Patent: Jan. 11, 2011

(54) DEVICE, METHOD, AND PROGRAM FOR GENERATING HIGH-RESOLUTION IMAGE DATA AT A LOW DATA TRANSFER RATE

(75) Inventors: Hideto Motomura, Kyoto (JP); Takeo Azuma, Kyoto (JP); Kunio Nobori, Osaka (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/530,520

(22) PCT Filed: Dec. 18, 2008

(86) PCT No.: PCT/JP2008/003834

§ 371 (c)(1),
(2), (4) Date: Sep. 9, 2009

(87) PCT Pub. No.: WO2009/087725

PCT Pub. Date: Jul. 16, 2009

(65) Prior Publication Data

US 2010/0103297 A1     Apr. 29, 2010

(30) Foreign Application Priority Data

Jan. 9, 2008    (JP) .............................. 2008-002515

(51) Int. Cl.
*H04N 5/228* (2006.01)
(52) U.S. Cl. .................... 348/222.1; 348/294; 348/335; 348/235; 250/208.1
(58) Field of Classification Search ................. 348/335, 348/294, 222.1
See application file for complete search history.

(56) References Cited

U.S. PATENT DOCUMENTS

2005/0219642 A1    10/2005    Yachida et al.

FOREIGN PATENT DOCUMENTS

| JP | 07-203318 | 8/1995 |
|----|-----------|--------|
| JP | 2005-318548 | 11/2005 |
| JP | 2007-133810 | 5/2007 |

OTHER PUBLICATIONS

International Search Report for corresponding application No. PCT/JP2008/003834 mailed Mar. 24, 2009.
Co-pending U.S. Appl. No. 12/600,376, filed Nov. 16, 2009.
Co-pending U.S. Appl. No. 12/756,707, filed Apr. 8, 2010.

*Primary Examiner*—Sinh Tran
*Assistant Examiner*—Paul Berardesca
(74) *Attorney, Agent, or Firm*—Renner, Otto, Boisselle & Sklar, LLP

(57) ABSTRACT

An image data generator 100 according to the present invention includes a shooting section 103, a color separating section 104, R, G and B imaging sensor sections 105, 106 and 107, an image shot storage section 108, an image shot writing section 109, a spatial frequency calculating section 186, a color channel range distribution calculating section 187, a color channel range distribution information writing section 188, a memory section 110, a shooting information reading section 111, a super-resolution section 240, an output section 114 and a line recognition signal generating section 185. This image data generator can get high-spatial-resolution, high-temporal-resolution image data with the same camera configuration as a conventional color camera and without decreasing the optical efficiency.

11 Claims, 33 Drawing Sheets

FIG. 2
(a)
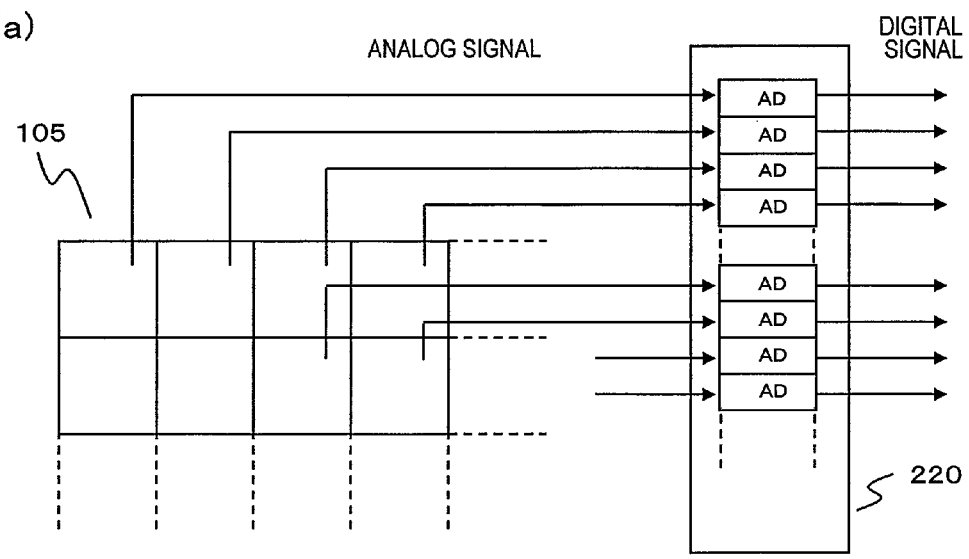
(b)
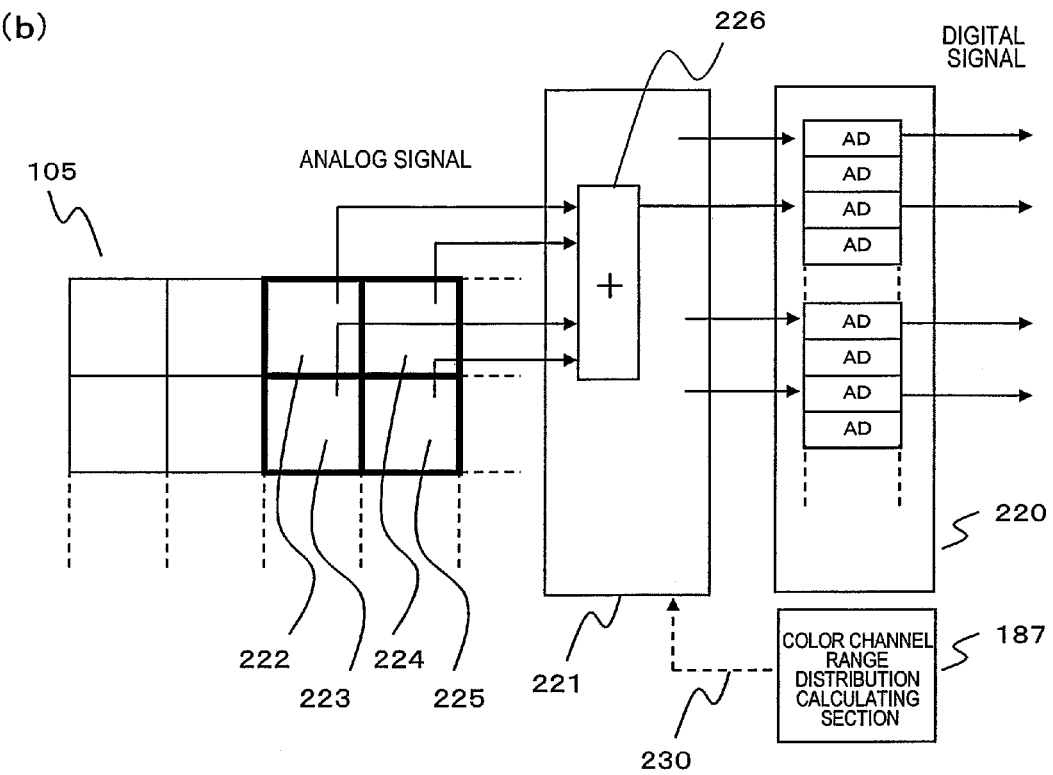

SPATIAL FREQUENCY SPECTRUM

FIG. 5
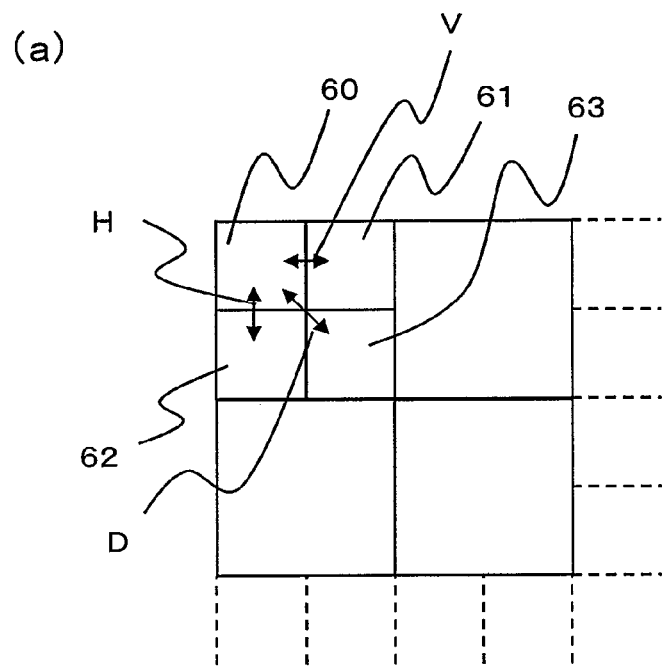
(a)
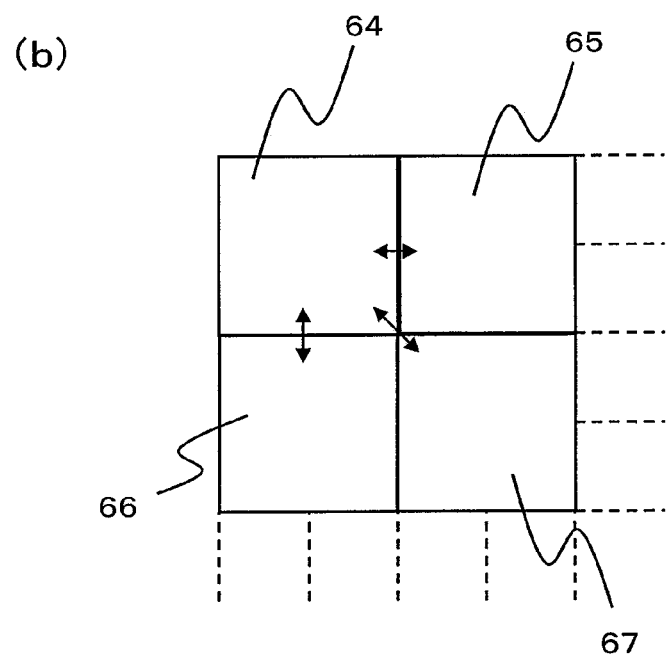
(b)

FIG. 7
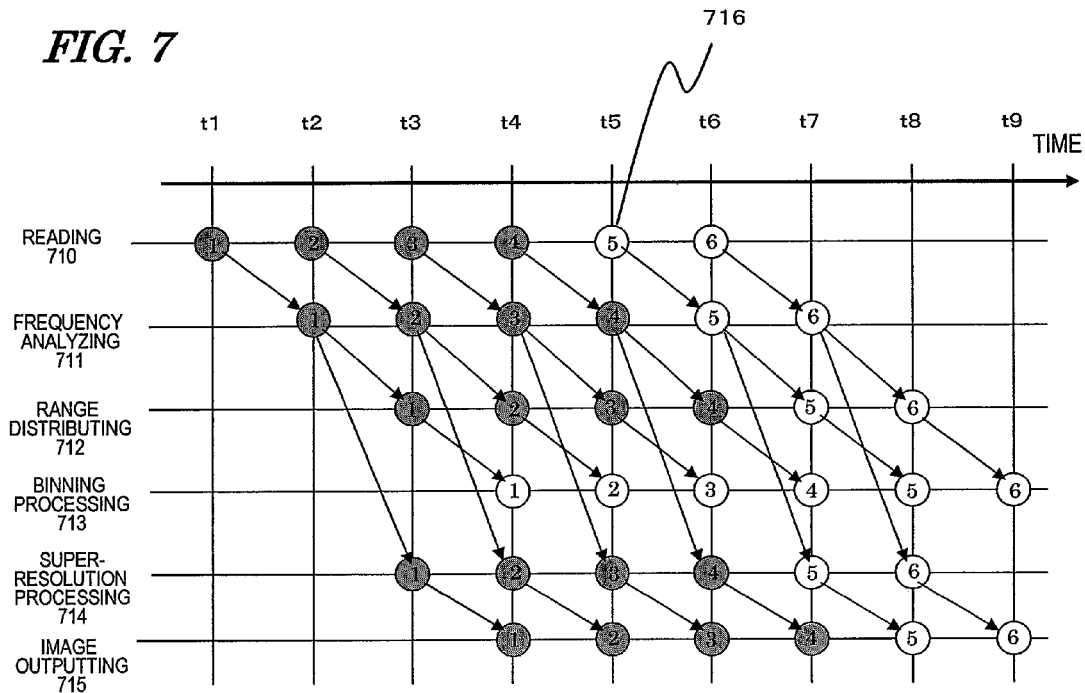
 n^TH DATA TO BE TRANSFERRED AT THE SAME RATE ON EACH COLOR CHANNEL
 n^TH DATA TO HAVE ITS DATA TRANSFER RATE ON EACH COLOR CHANNEL DETERMINED BY BINNING PROCESSING

FIG. 11
(a)
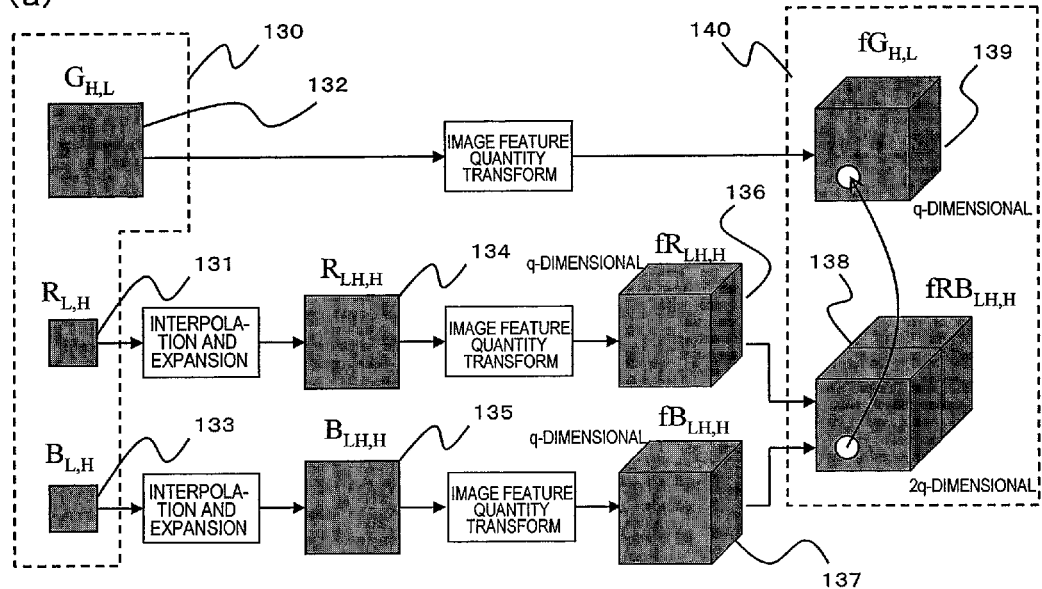
(b)
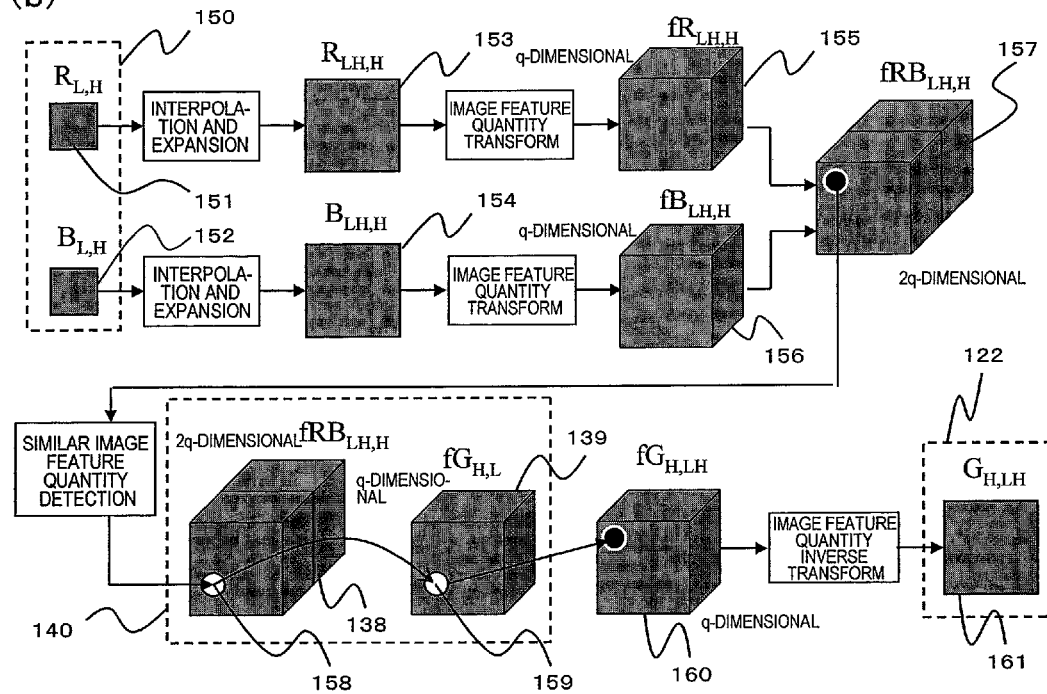

FIG. 21
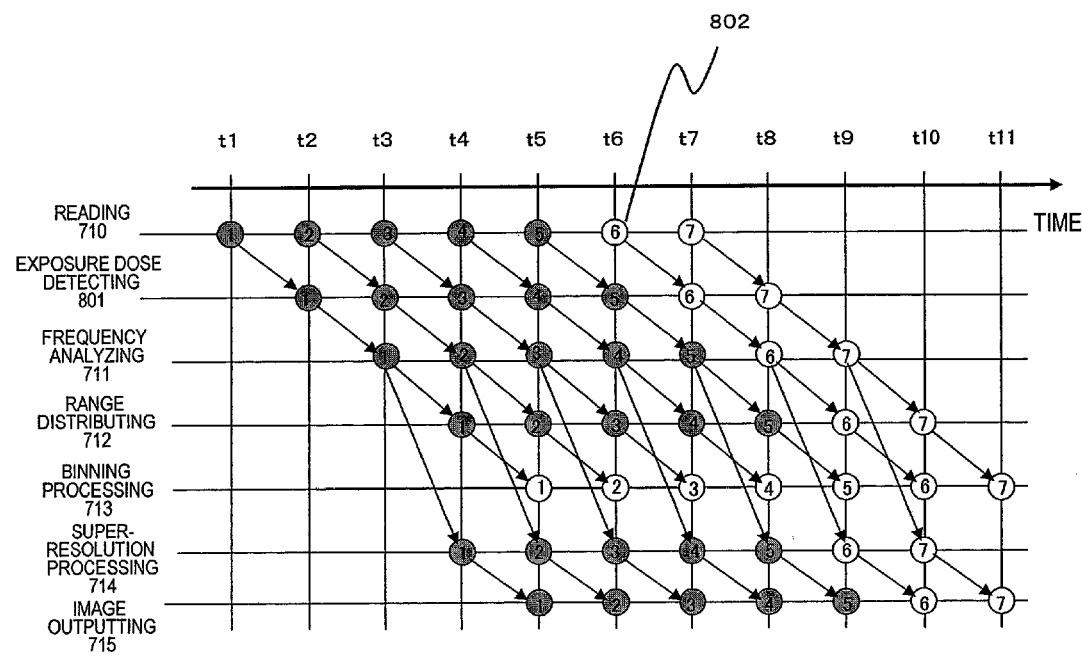
 $n^{TH}$ DATA TO BE TRANSFERRED AT THE SAME RATE ON EACH COLOR CHANNEL
 $n^{TH}$ DATA TO HAVE ITS DATA TRANSFER RATE ON EACH COLOR CHANNEL DETERMINED BY BINNING PROCESSING

FIG. 28 Conventional Art
(a)
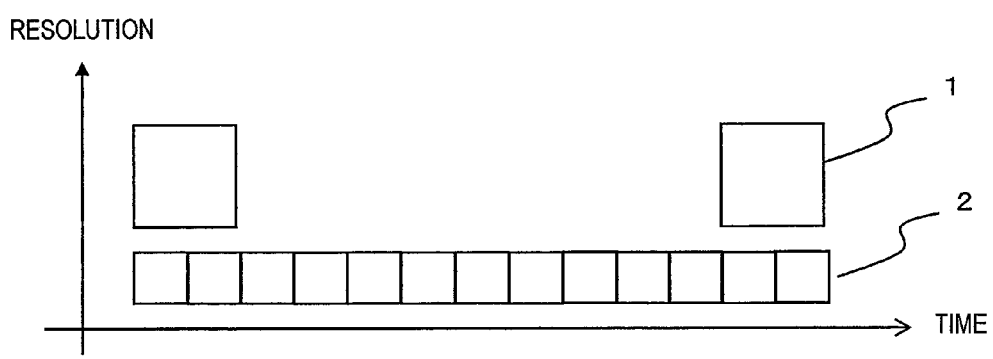
(b)
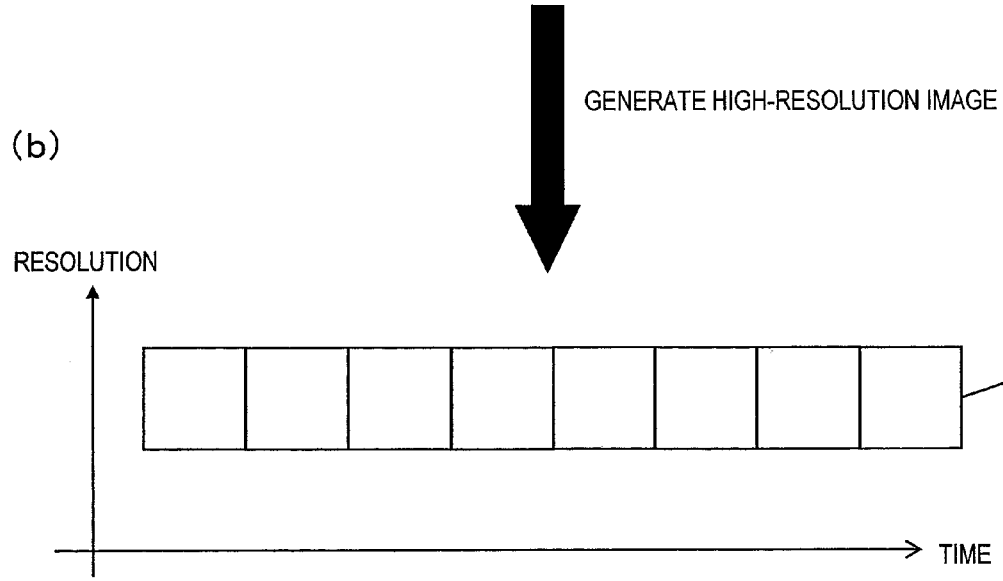

DEVICE, METHOD, AND PROGRAM FOR GENERATING HIGH-RESOLUTION IMAGE DATA AT A LOW DATA TRANSFER RATE

FOREIGN PRIORITY

This application claims priority to Japanese Patent Application 2008-002515, filed on Jan. 9, 2008.

TECHNICAL FIELD

The present invention relates to an apparatus and method for capturing a high-resolution image at a high frame rate, an apparatus and method for capturing, recording and playing such an image at a high frame rate, and a program for capturing and recording such an image at such a rate.

BACKGROUND ART

Recently, a digital camcorder or digital still camera has come to have an imager, including photosensing elements at tremendously high densities, and have had their definitions increased by leaps and bounds. Generally speaking, the higher the resolution of an image captured, the more finely the user can record the scene before him or her. That is why there is an increasing demand for such high-resolution shooting.

The resolutions are classifiable into the spatial resolution and the temporal resolution. The resolution of the former type corresponds to the number of pixels that make up a single picture. If there are two imaging sensors of the same size but with different number of pixels, then an imaging sensor with the greater number of pixels will have a higher spatial resolution, and can record the details of the subject more finely, than the other imaging sensor. As a result, with such an imaging sensor, the user can shoot a still picture with higher presence and higher image quality. On the other hand, the resolution of the latter type corresponds to the number of pictures shot per unit time. An imaging sensor that can shoot a greater number of pictures per second will have a higher temporal resolution. Thus, with such an imaging sensor, the user can track even quick motions of the subject precisely, and can shoot a moving picture with smoother motion.

However, if the user wants to shoot the scene before him or her as finely as possible, he or she often opts for the highest possible spatial and temporal resolutions, thus making the data size of the picture huge. A DV camcorder, for example, will produce an image with a size of 720 pixels×480 lines. Supposing the frame rate is 30 frames per second, a 24 bit RGB color signal should have a data transfer rate of 249 Mbps (megabits per second)(=720 pixels×480 lines×24 bits×30). Meanwhile, a high definition camcorder will produce an image with a size of 1,920 pixels×1,080 lines. And the data transfer rate will be 1.5 Gbps (=1,920 pixels×1,080 lines×24 bits×30), which is six times as high as that of the DV camcorder. If the temporal resolution was doubled and the frame rate was increased to 60 frames per second, then the data transfer rate would be 3 Gbps. In such a situation, the data transfer rate should always be that high since the data has been output from the imaging sensor of the camera and until it is written on a storage medium or until the display monitor is scanned. However, with that high data transfer rate, the load on a normal consumer camcorder or digital camera would be too heavy to handle. That is why by utilizing its redundancy, the data is usually compressed to keep the device as small as possible, cut down the power dissipation, and minimize the cost. Even in camcorders or digital cameras for business use, the data size is also often cut down by compression. And only expensive editing systems for professional use will operate at the original data transfer rate.

As can be seen, to transmit and receive such a high-definition image, of which the spatial and temporal resolutions are both high, at as low a data transfer rate as possible, it is important to acquire only essential data and cut down the redundancy. For that purpose, a technique for acquiring only essential data when an image is captured would work fine. For example, Patent Document No. 1 discloses a technique for acquiring image data 1 with high spatial resolution but low temporal resolution and image data 2 with low spatial resolution but high temporal resolution as shown in FIG. 28(*a*) and then generating image data 3 with high spatial resolution and high temporal resolution by performing image processing on them as shown in FIG. 28(*b*).

Supposing the shooting time is one second, the image data 1 has an image size of 1,920 pixels×1,080 lines, and the image data 2 has an image size of 640 pixels×360 lines in the example illustrated in FIG. 28, the 8-bit luminance signal shown in FIG. 28(*a*) comes to have a data transfer rate of 54 Mbps (=1,920 pixels×1,080 lines×8 bits×2+640 pixels×320 lines×8 bits×13). In FIG. 28(*b*), on the other hand, as there are eight pictures each consisting of 1,920 pixels×1,080 lines, the 8-bit luminance signal comes to have a data transfer rate of 133 Mbps (=1,920 pixels×1,080 lines×8 bits×8). Consequently, the data transfer rate in FIG. 28(*b*) is approximately 2.4 times as high as the one in FIG. 28(*a*).

FIG. 29 is a flowchart showing the procedure for generating the image data 3. As shown in FIG. 29, a motion vector is estimated with the low-spatial-resolution image represented by the image data 2. Based on a result of the motion estimation, the high-spatial-resolution image of the image data 1 is subjected to motion compensation. Next, the DCT (discrete cosine transform) spectrum of the motion-compensated high-spatial-resolution image is synthesized with that of its associated low-spatial-resolution image, and then an inverse DCT is carried out on the synthesized spectrum, thereby obtaining a target high-spatial-resolution, high-temporal-resolution image.

FIG. 30 illustrates an exemplary configuration for a composite sensor camera 4 for acquiring the image data 1 and 2. The composite sensor camera 4 is a camera for capturing two types of image data with the same field of view and includes a light splitting element 5 such as a prism or a half mirror, two lenses 6, a high-spatial-resolution, low-temporal-resolution camera 7 and a low-spatial-resolution, high-temporal-resolution camera 8. The light splitting element 5 partially reflects incoming light 9. The two lenses 6 condense the light that has been reflected by the light splitting element 5 and the light that has been transmitted by the light splitting element 5, respectively. The high-spatial-resolution, low-temporal-resolution camera 7 produces an image based on the light that has been condensed by the one lens 6, thereby outputting the image data 1. On the other hand, the low-spatial-resolution, high-temporal-resolution camera 8 produces an image based on the light that has been condensed by the other lens 6, thereby outputting the image data 2.

Patent Document No. 1: Japanese Patent Application Laid-Open Publication No. 2005-318548 (FIGS. 2, 3 and 5)

DISCLOSURE OF INVENTION

Problems to be Solved by the Invention

However, the conventional image capturing technology described above has the following drawbacks in terms of the sensitivity of the imaging sensor and RGB color shooting. Specifically, in the composite sensor camera 4, the light splitting element 5 distributes the incoming light 9 to the high-spatial-resolution, low-temporal-resolution camera 7 and the low-spatial-resolution, high-temporal-resolution camera 8, and therefore, the intensity of the light entering each of these cameras decreases to a half, which would decrease the signal to noise ratio (SNR) of the image captured and eventually debase the image quality more often than not. Nevertheless, if the exposure were performed for a longer time to check the decrease in SNR, then the image would possibly be blurred, thus resulting in deteriorated image quality in many cases.

Also, to capture an RGB color image, three composite sensor cameras 4 should be provided (which will be identified herein by the reference numerals 41, 42 and 43, respectively) as shown in FIG. 31. And to distribute the incoming light 9 to those three composite sensor cameras 41, 42 and 43, two color separation filters 10 and 11 should be used. In this case, the color separation filter 10 would reflect long wavelength components (falling within the range of approximately 600-780 nm) but transmit the other wavelength components. The reflected light 12 would be incident on the composite sensor camera 41, where those long wavelength components would be captured to produce an R image. Meanwhile, the light 13 transmitted through the color separation filter 10 would be incident on the color separation filter 11, which would reflect the short wavelength components (falling within the range of approximately 380-500 nm) but transmit the other wavelength components. Then, the reflected light 14 would be incident on the composite sensor camera 42, where those short wavelength components would be captured to produce a B image. And the light 15 to be transmitted through the color separation filter 11 would be the rest of the incoming light 9 other than its components 12 and 14 that have been reflected by the color separation filters 10 and 11, respectively, and would be the remaining middle wavelength components (falling within the range of approximately 500-600 nm). The transmitted light 15 would be incident on the composite sensor camera 43, where those middle wavelength components would be captured to produce a G image. Thus, the addition of the color separation filters 10 and 11 to the composite sensor cameras would increase the sizes of the cameras and decrease the handiness and portability thereof.

On the other hand, to prevent the camera from increasing its overall size, a color filter layer 16 such as the one shown in FIG. 33 could be arranged as shown in FIG. 32 before each of the high-spatial-resolution, low-temporal-resolution camera 7 and low-spatial-resolution, high-temporal-resolution camera 8, thereby separating the incoming light into the RGB images. Specifically, in the color filter layer 16, the color filters located at pixels 20 would transmit only G components with middle wavelengths and absorb R and B components with long and short wavelengths, thereby producing a G image. In the same way, the color filters located at pixels 21 would transmit only R components with long wavelengths and absorb G and B components with middle and short wavelengths, thereby producing an R image. And the color filters located at pixels 22 would transmit only B components with short wavelengths and absorb R and G components with long and middle wavelengths, thereby producing a B image. In this manner, the color filter layer 16 would get the color separation done with components of the incoming light with unnecessary wavelengths absorbed. As a result, the optical efficiency would be eventually lower than a monochrome camera. That is to say, as the incoming light should be separated into the three colors of R, G and B, approximately a third of the incoming light would be incident on the camera and the other two-thirds would be absorbed into the color filter layer 16, theoretically speaking.

It is therefore an object of the present invention to provide apparatus, method, program and shooting, recording and playback system that can acquire image data with high spatial resolution and high temporal resolution by using a camera with a similar configuration to a conventional one without decreasing its optical efficiency with respect to the incoming light.

Means for Solving the Problems

An image data generator according to the present invention includes: a light splitting section for splitting incoming light into a number of wavelength ranges; an imager section including a plurality of image capturing sections, in each of which arranged are multiple photoelectric transducer units, each outputting an analog signal representing the incoming light, wherein the image capturing sections receive and capture the incoming light, which has been split into those wavelength ranges by the light splitting section, thereby outputting the analog signals on a wavelength range basis; an A/D converter section having the function of adding together the analog signals that have been output by the photoelectric transducer units, the converter section converting either each of the analog signals supplied from the photoelectric transducer units or the sum thereof into a digital signal; a spatial frequency calculating section for generating frequency spectrum distribution data of the digital signal; a range distribution calculating section having the ability to specify the number of photoelectric transducer units, of which the output analog signals are to be added together by the A/D converter section, on a wavelength range basis by reference to the frequency spectrum distribution data; and a super-resolution section for increasing high-frequency components of the frequency spectrum distribution data of the digital signal that has been supplied from the A/D converter section.

In one preferred embodiment, the super-resolution section restores at least a part of the high-frequency components of the frequency spectrum distribution data, which have been lost as a result of the addition of the analog signals by the A/D converter section.

In another preferred embodiment, the light splitting section separates the incoming light that has come from a subject into red, green and blue light beams. The imager section receives the red, green and blue light beams and outputs R, G and B images. The A/D converter section adds together the analog signals supplied from the imager section such that the sum of the data transfer rates of the R, G and B images becomes equal to a predetermined value. The range distribution calculating section calculates the frequency spectrum energies in predetermined frequency ranges with respect to the R, G and B images and defines the ratio of the inverse ones of the respective numbers of analog signals that have been added together by the A/D converter section to be the ratio of the frequency spectrum energies of the R, G and B images.

In still another preferred embodiment, the range distribution calculating section enters a method for adding the analog signals in the A/D converter section into the super-resolution section so that the method is used to perform a resolution lowering process.

In yet another preferred embodiment, the super-resolution section acquires a low-spatial-resolution, high-temporal-resolution image and a high-spatial-resolution, low-temporal-resolution image, which have been generated by the A/D converter section, according to the wavelength range that has been specified by the range distribution calculating section. The super-resolution section converts the temporal resolution of the high-spatial-resolution, low-temporal-resolution image into that of the low-spatial-resolution, high-temporal-resolution image based on a correspondence between a low-spatial-resolution image and a high-spatial-resolution image, thereby generating a high-spatial-resolution, high-temporal-resolution image.

In yet another preferred embodiment, the imager section includes an exposure measuring section for measuring the intensity of the light that has been split, and the A/D converter section adds together the analog signals such that the intensity of the light measured reaches a predetermined value.

An image data generating method according to the present invention includes the steps of: splitting light that has come from a subject; receiving the split light and outputting analog signals; providing the option of adding those analog signals together and converting either the sum of the analog signals or each said analog signal that has not been added together into a digital signal; specifying the number of the analog signals to be added together on a wavelength range basis according to the magnitude of energy of the frequency spectrum of the digital signal; and restoring at least a part of frequency components that have been lost as a result of the addition of the analog signals.

A program according to the present invention is designed to get image data generating processing carried out by an image data generator with an image capturing section. The image data generating processing is defined to make the image data generator perform the steps of: making the image capturing section receive split light that has come from a subject and output analog signals; converting either the sum of the analog signals or each said analog signal that has not been added together into a digital signal; specifying the number of the analog signals to be added together on a wavelength range basis according to the magnitude of energy of the frequency spectrum of the digital signal; and restoring at least a part of frequency components that have been lost as a result of the addition of the analog signals.

An image capture device according to the present invention includes: a light splitting section for splitting incoming light into a number of wavelength ranges; an imager section including a plurality of image capturing sections, in each of which arranged are multiple photoelectric transducer units, each outputting an analog signal representing the incoming light, wherein the image capturing sections receive and capture the incoming light, which has been split into those wavelength ranges by the light splitting section, thereby outputting the analog signals on a wavelength range basis; an A/D converter section having the function of adding together the analog signals that have been output by the photoelectric transducer units, the converter section converting either each of the analog signals supplied from the photoelectric transducer units or the sum thereof into a digital signal; a spatial frequency calculating section for generating frequency spectrum distribution data of the digital signal; and a range distribution calculating section having the ability to specify the number of photoelectric transducer units, of which the output analog signals are to be added together by the A/D converter section, on a wavelength range basis by reference to the frequency spectrum distribution data.

An image processor according to the present invention includes an input section that receives the digital signal that has been generated by the image capture device of the present invention and binning processing information indicating the number of the photoelectric transducer units, of which the output analog signals have been added together by the A/D converter section. The super-resolution section restores at least a part of the high-frequency components of the frequency spectrum distribution data, which have been lost as a result of the addition of the analog signals by the A/D converter section.

In one preferred embodiment, the input section has a structure to be loaded with a storage medium on which the digital signal and the binning processing information are stored.

Effects of the Invention

According to the present invention, high-spatial-resolution, high-temporal-resolution image data of a huge size can be acquired at more than the data transfer rate of imaging sensors while using a similar configuration to a conventional three-panel color camera. As a result, a quality image with a higher resolution can be obtained without sacrificing the portability or price competitiveness.

BRIEF DESCRIPTION OF DRAWINGS

FIG. 2 illustrates the binning function that not only the R imaging sensor section 105 shown in FIG. 2 but also the other G and B imaging sensor sections 106 and 107 have in common.

FIG. 5 illustrates examples of Haar mother Wavelet.

FIG. 7 shows the timings to operate an image data generator 700.

FIG. 11 illustrates a principle on which the temporal resolution upconverter section 113 generates a G image 122.

FIG. 21 shows the timings to operate the image data generator 800.

FIG. 28 illustrates conceptually how to get high-spatial-resolution, low-temporal-resolution image data 1 and low-spatial-resolution, high-temporal-resolution image data 2 and generate high-spatial-resolution, high-temporal-resolution image data 3.

DESCRIPTION OF REFERENCE NUMERALS

Figure 1:
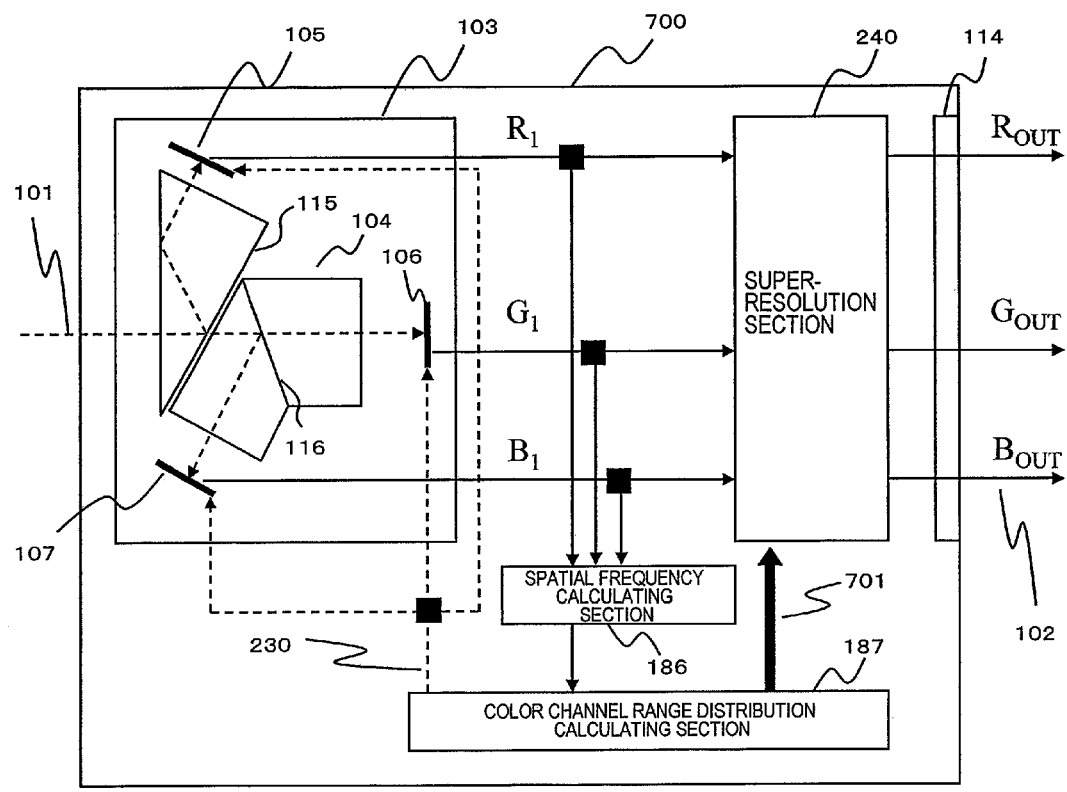
FIG. 1 is a block diagram illustrating a configuration for an image data generator as a first specific preferred embodiment of the present invention.

100, 200, 300, 400 image data generator
101 incoming light
102 RGB images ($R_{OUT}$ $G_{OUT}$ $B_{OUT}$) with high spatial resolution and high temporal resolution
103 shooting section
104 color separating section
105 R imaging sensor section
106 G imaging sensor section
107 B imaging sensor section
108 image shot storage section
109 image shot writing section
110 memory section
111 image shot reading section
112 spatial resolution upconverter section
113 temporal resolution upconverter section
114 output section
185 line recognition signal generating section
186 spatial frequency calculating section
187 color channel range distribution calculating section
188 color channel range distribution information write section
500 image capture device
600 image processor

BEST MODE FOR CARRYING OUT THE INVENTION

Hereinafter, preferred embodiments of the present invention will be described in detail with reference to the accompanying drawings.

In the following description and the drawings, the colors red, green and blue are identified by the signs R, G and B, respectively, for the sake of simplicity. For example, an "R image", a "G image" and a "B image" mean an image representing the red components of light, an image representing the green components of light, and an image representing the blue components of light, respectively.

Embodiment 1

FIG. 1 is a block diagram illustrating an image data generator 700 as a first specific preferred embodiment of the present invention.

The image data generator 700 receives incoming light 101, stores an image shot, and then subjects the image shot to be reproduced to resolution raising processing, thereby outputting RGB images with high spatial resolution and high temporal resolution ($R_{OUT}$ $G_{OUT}$ $B_{OUT}$) 102. The image data generator 700 calculates a spatial frequency spectrum on a wavelength range basis. In the following description of preferred embodiments, the entire spatial frequency spectrum is supposed to be split into three wavelength ranges for R, G and B, which will be referred to herein as "color channels". The image data generator 700 calculates the spatial frequency spectra for the respective color channels, and then acquires an HL image on a color channel with the highest spatial frequency component and LH images on the other color channels. Furthermore, the image data generator 700 converts the temporal resolution of the HL image into that of the LH images based on the correspondence between the low- and high-spatial-resolution images, thereby generating an HH image.

As shown in FIG. 1, the image data generator 700 includes a shooting section 103, a color separating section 104, an R imaging sensor section 105, a G imaging sensor section 106, a B imaging sensor section 107, a spatial frequency calculating section 186, a color channel range distribution calculating section 187, a super-resolution section 240, and an output section 114.

Figure 31:
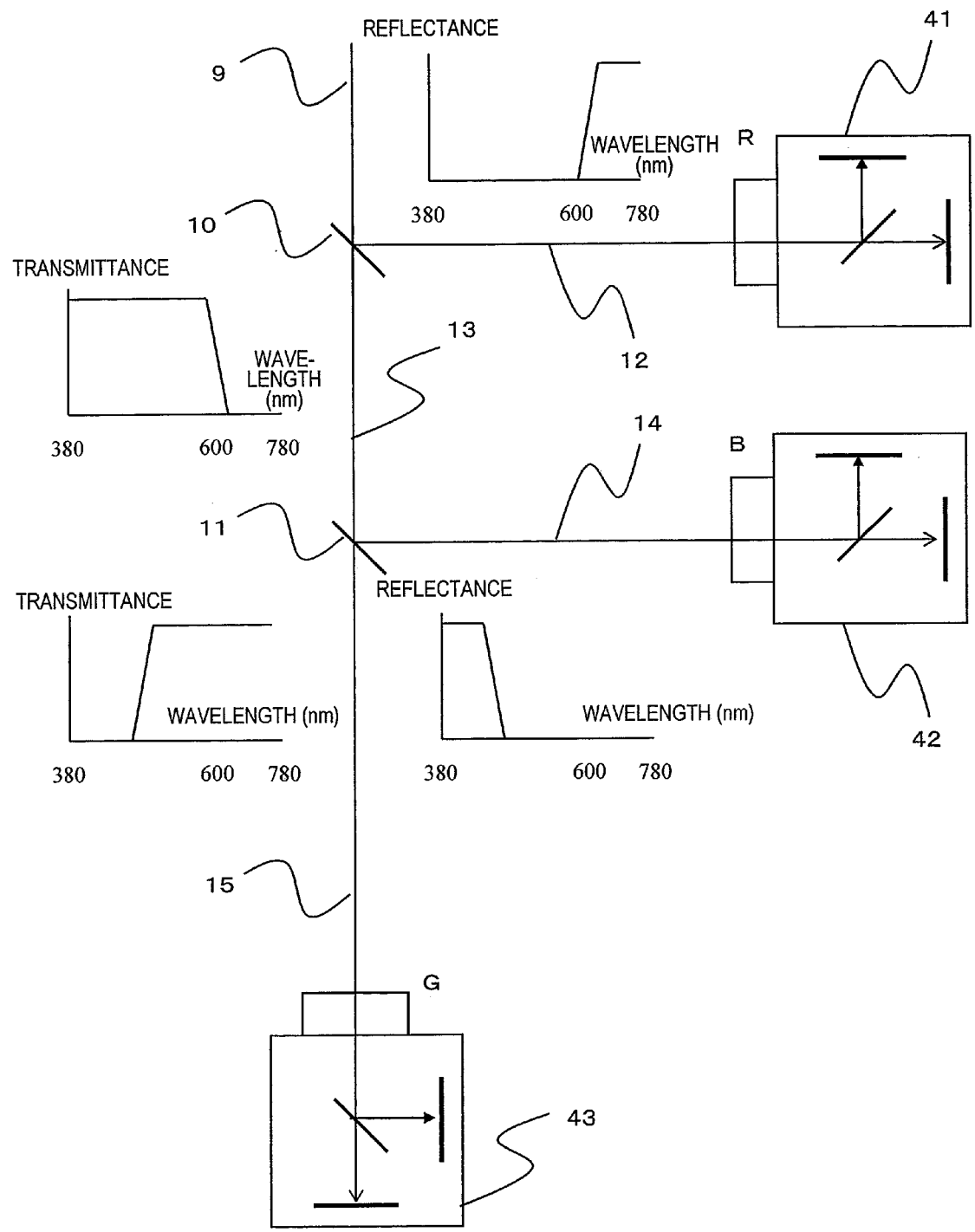
FIG. 31 illustrates how to get RGB color shooting done.
Figure 32:
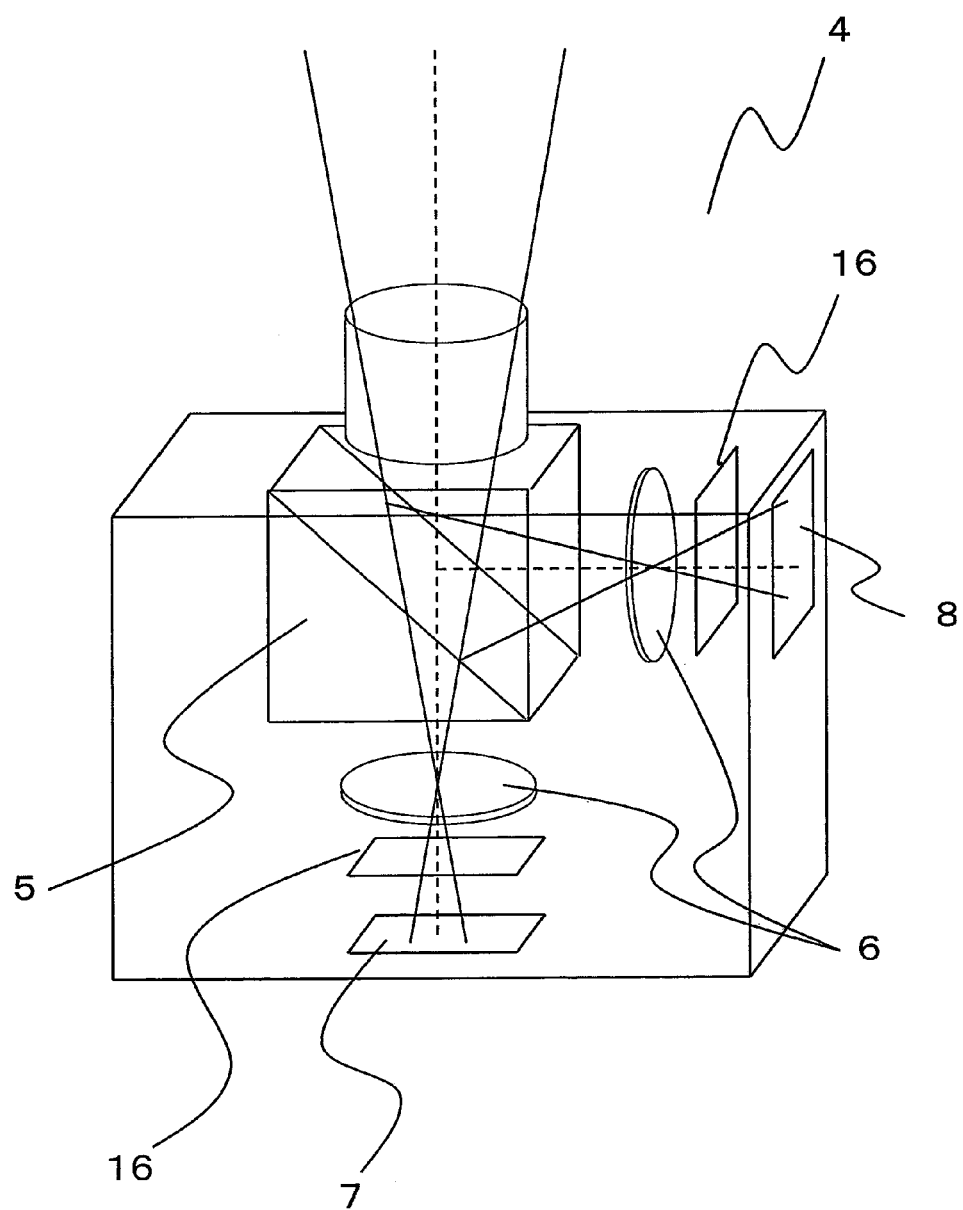
FIG. 32 illustrates an exemplary configuration for a composite sensor camera to get the RGB color shooting done.
Figure 33:
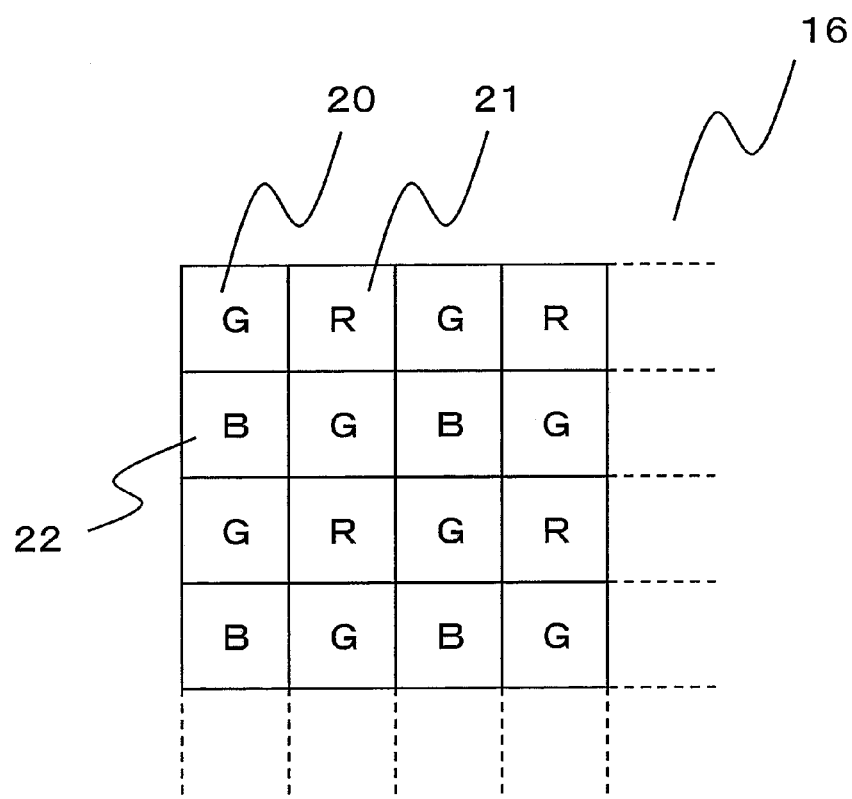
FIG. 33 illustrates the details of the color filter layer 16.

The shooting section 103 receives the incoming light 101 and outputs a color image $R_1G_1B_1$. The color separating section 104 functions as a light splitting section for splitting the incoming light 101 into a long wavelength range R, a middle wavelength range G and a short wavelength range B and gets color separation done such that the R, G and B imaging sensor sections 105, 106 and 107 can capture $R_1$, $G_1$ and $B_1$ images, respectively. The plane 115 corresponds to the color separation filter 10 shown in FIG. 31 and reflects a part of the light falling within the long wavelength range R but transmits the rest of the light falling within the other wavelength ranges. The plane 116 corresponds to the color separation filter 11 shown in FIG. 31 and reflects a part of the light falling within the short wavelength range B but transmits the rest of the light falling within the other wavelength ranges.

FIG. 2 illustrates the binning (i.e., pixel adding or mixing) function that not only the R imaging sensor section 105 shown in FIG. 2 but also the other G and B imaging sensor sections 106 and 107 have in common.

The physically minimum unit for performing photoelectric conversion for the purpose of imaging on the image capturing plane of an image capturing section is usually called a "pixel". To describe the features of the present invention exactly, however, the "pixel" that is the minimum constituent unit of an image should not be confused with such a physically minimum unit for performing a photoelectric conversion there. That is why the latter minimum unit will be referred to herein as a "photoelectric transducer unit", which outputs an electrical signal (which is an analog signal) representing the intensity (or the amount) of the light that has been incident on the photoelectric transducer. It should be noted that when the configuration and operation of an imaging sensor section are described, the number of the "photoelectric transducer units" will be sometimes referred to herein as the "number of pixels" for the sake of simplicity.

As shown in FIG. 2(a), the R imaging sensor section 105 of this preferred embodiment has an image capturing plane on which a huge number of photoelectric transducer units are arranged as a two-dimensional array. Also, the R imaging sensor section 105 has an A/D converter section 220 for converting an analog signal supplied from a photoelectric transducer unit into a digital signal. FIG. 2(b) illustrates how a binning section 221 works on a matrix consisting of two pixels by two lines as an example.

The four analog signals supplied from the photoelectric transducer units 222, 223, 224 and 225 shown in FIG. 2(b) are added together by an adder 226, and then the sum is input to the A/D converter section 220. By adding those four analog signals together, the data size will shrink to one fourth, and the data transfer rate of the A/D converter section 220 will also decrease to one fourth with respect to the number of the photoelectric transducer units (i.e., the number of pixels). Supposing the R imaging sensor section 105 has a high definition resolution defined by 1,920 pixels by 1,080 lines, the binning processing of 2 pixels by 2 lines would produce an $R_1$ image, consisting of 960 pixels by 540 lines, as a digital signal.

As will be described later, the binning section 221 determines the number of pixels and the number of lines to be subjected to the binning processing in accordance with a color channel range distribution signal 230 supplied from the color channel range distribution calculating section 187 shown in FIG. 2(b). In this preferred embodiment, the G imaging sensor section 106 is supposed to have a high definition resolution consisting of 1,920 pixels by 1,080 lines for the sake of convenience. Meanwhile, the number of pixels and the number of lines of the R and B imaging sensor sections 105 and 107 are one fourth as large as those of the G imaging sensor section 106, i.e., 480 pixels by 270 lines. On the other hand, the relation between the temporal resolution of the G imaging sensor section 106 and that of the other imaging sensor sections is quite opposite to the one between their spatial resolutions. Specifically, the G imaging sensor section 106 has a temporal resolution of 2 fps (frames per second), while the R and B imaging sensor sections 105 and 107 have a temporal resolution of 15 fps. Thus, in this preferred embodiment, the G imaging sensor section 106 has a low temporal resolution, and the R and B imaging sensor sections 105 and 107 have a high temporal resolution.

It should be noted that the details of the binning processing to be performed by the binning section 221 could be determined arbitrarily for each color channel. That is why the R and B imaging sensor sections 105 and 107 do not have to have the same number of pixels and the same number of lines subjected to the binning processing.

Figure 3:
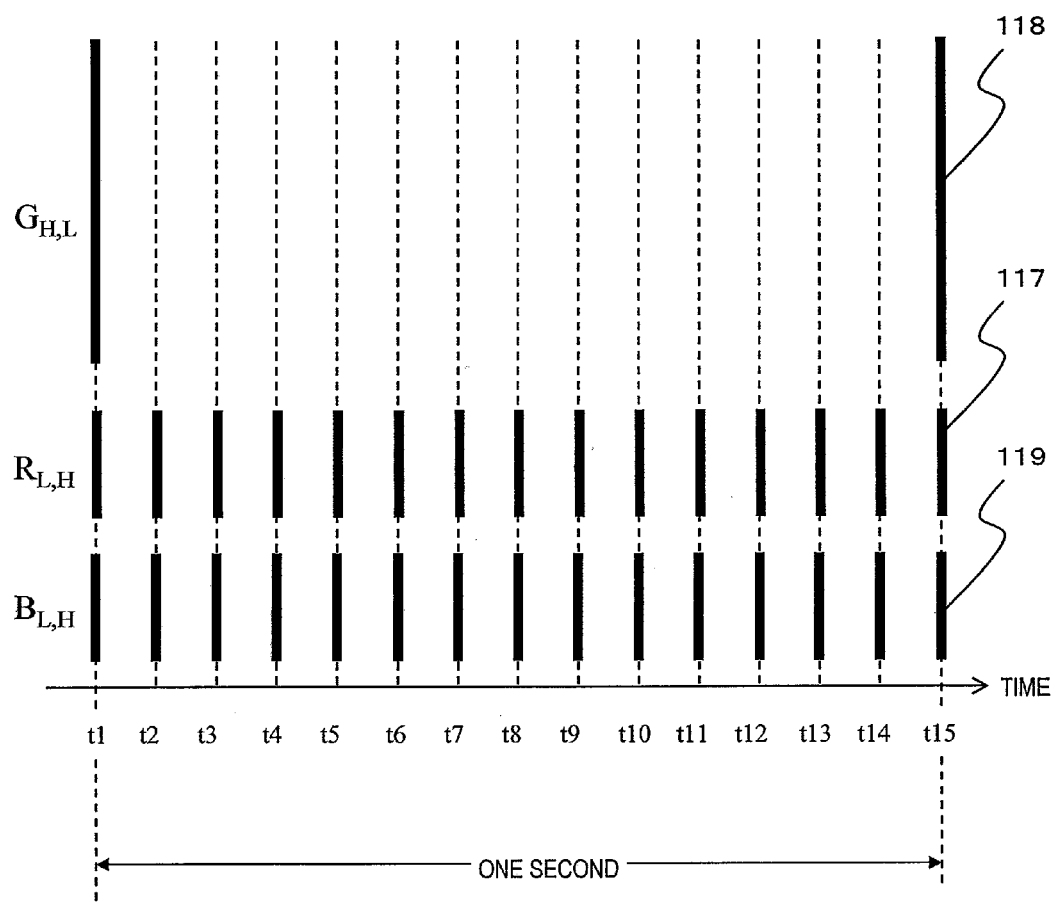
FIG. 3 schematically illustrates the relations between the R, G and B imaging sensor sections 105, 106 and 107 in terms of spatial and temporal resolutions.

FIG. 3 schematically illustrates the relations between the R, G and B imaging sensor sections 105, 106 and 107 in terms of spatial and temporal resolutions. Specifically, the G image 118 shot by the G imaging sensor section 106 includes only two pictures that were taken at times t1 and t15. On the other hand, the R image 117 shot by the R imaging sensor section 105 and the B image 119 shot by the B imaging sensor section 107 include 15 pictures that were taken from the time t1 through the time 15.

In this description, the degrees of the spatial and temporal resolutions of each of the R, G and B images will be denoted herein by $X_{S,T}$, where X is R, G or B, S denotes a spatial resolution that is either high (H) or low (L), and T denotes a temporal resolution that is either high (H) or low (L).

That is to say, X denotes the type of the image (that is one of R, G and B), S indicates the degree of spatial resolution, and T indicates the degree of temporal resolution. The degrees of resolutions are determined to be relatively high or relatively low. In this example, the respective degrees of resolutions are defined as follows:

High spatial resolution: 1,920 pixels by 1,080 lines
Low spatial resolution: 480 pixels by 270 lines
High temporal resolution: 15 fps and
Low temporal resolution: 2 fps As shown in FIG. 3, the G image that is the output of the G imaging sensor section 106 has high spatial resolution and low temporal resolution, and therefore is identified herein by $G_{H,L}$. On the other hand, the R image that is the output of the R imaging sensor section 105 and the B image that is the output of the B imaging sensor section 107 have low spatial resolution and high temporal resolution, and therefore, are identified herein by $R_{L,H}$ and $B_{L,H}$, respectively.

Now look at FIG. 1 again.

Figure 4:
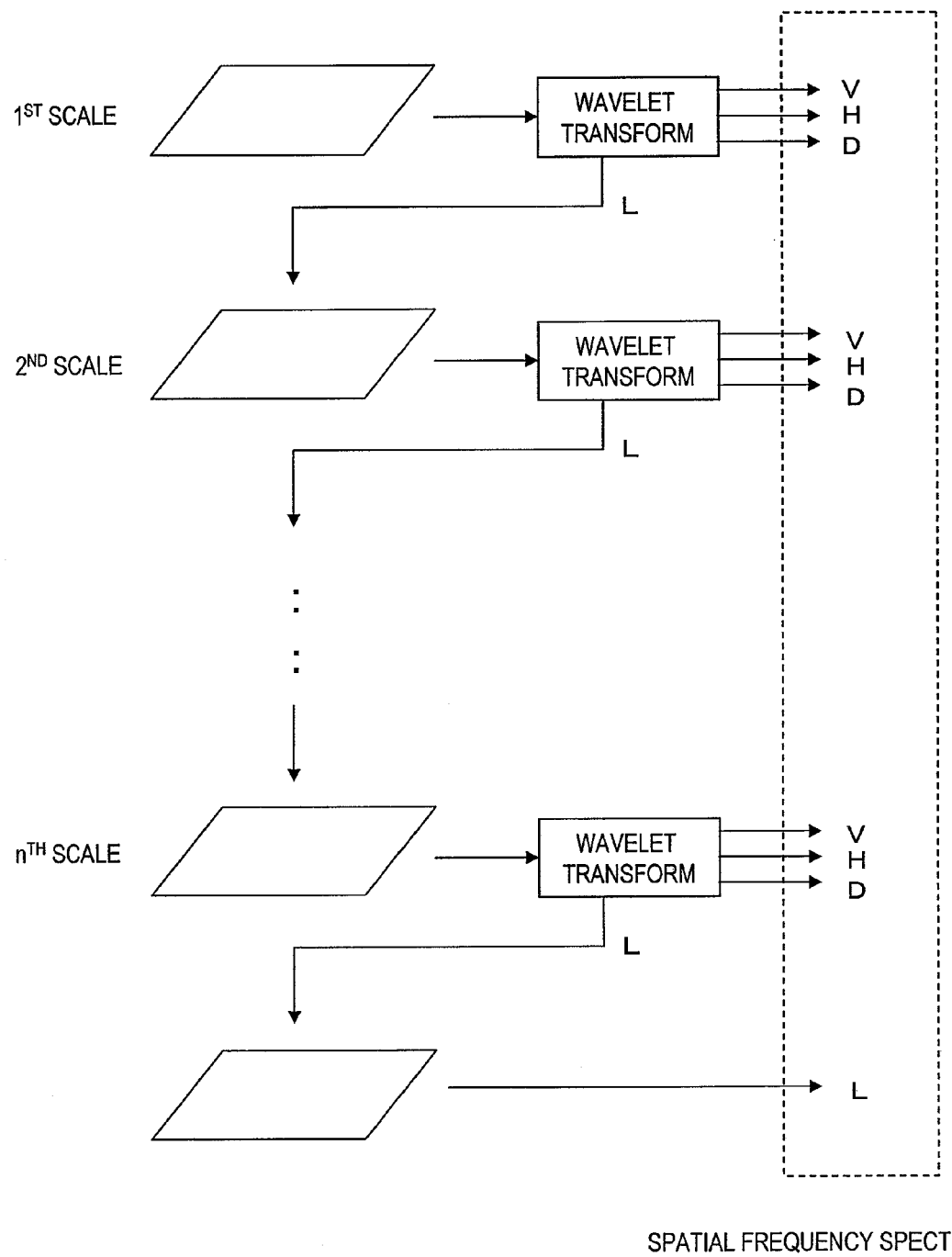
FIG. 4 illustrates how to perform a Wavelet transform.

The spatial frequency calculating section 186 calculates the spatial frequency distributions of the $R_1$, $G_1$ and $B_1$ images. The spatial frequencies may be calculated by any method but could be calculated by a Fourier transform or a Wavelet transform, for example. FIG. 4 illustrates how to perform the Wavelet transform using a multi-resolution representation of n scales. Specifically, at the $1^{st}$ scale, a difference in luminance between a given pixel and an adjacent pixel is calculated. When a transition is made to the $2^{nd}$ scale, the difference is smoothed out using multiple pixels. At the $2^{nd}$ scale, the differences in luminance between the given pixel and the adjacent pixels are calculated. However, the respective pixels at the $2^{nd}$ scale are obtained by smoothing out the pixels at the $1^{st}$ scale, and therefore, have lower frequencies than the pixels at the $1^{st}$ scale. That is why by repeatedly carrying out such calculations from the $1^{st}$ scale through the $n^{th}$ scale, the point of interest will gradually shift from the high frequency components toward low frequency components. As a result, the Wavelet coefficients V, H and D form a spatial frequency spectrum.

If the Haar mother Wavelet is adopted, then V is the difference between a pixel 60 of interest and a horizontally adjacent pixel 61 on the right-hand side, H is the difference between the pixel 60 and a vertically adjacent pixel 62 under the pixel 60, D is the difference between the pixel 60 and a diagonally adjacent pixel 63 on the lower right hand side, and L is the average of these four pixels consisting of the pixel 60 and the three adjacent pixels located on the right-hand side of the pixel 60, right under the pixel 60, and on the lower right hand side of the pixel 60 as shown in FIG. 5(a). The $1^{st}$ scale is illustrated in FIG. 5(a), while the $2^{nd}$ scale is illustrated in FIG. 5(b). At the $2^{nd}$ scale, it is the output L (which is the average of the four pixels at the $1^{st}$ scale) that the difference should be calculated on. Specifically, at the $2^{nd}$ scale, the output V is the difference between blocks 64 and 65, the output H is the difference between blocks 64 and 66, the output D is the difference between blocks 64 and 67, and the output L is the average of all of these blocks 64 through 67.

The color channel range distribution calculating section 187 shown in FIG. 1 determines the binning block sizes of the R, G and B imaging sensor sections 105, 106 and 107 in accordance with the spatial frequency spectra of the $R_1$, $G_1$ and $B_1$ images, respectively. As for an image captured on a color channel with a high spatial frequency, no binning processing is carried out to get high-frequency-range information. This is because if the binning processing were carried out, information about a range with high spatial frequencies (i.e., the high-frequency-range information) would be lost. As for images captured on color channels that do not have high-spatial-frequency components, on the other hand, there is no need to get any high-frequency-range information. That is why the binning processing is carried out to restrict the range and lower the data transfer rate.

Figure 6:
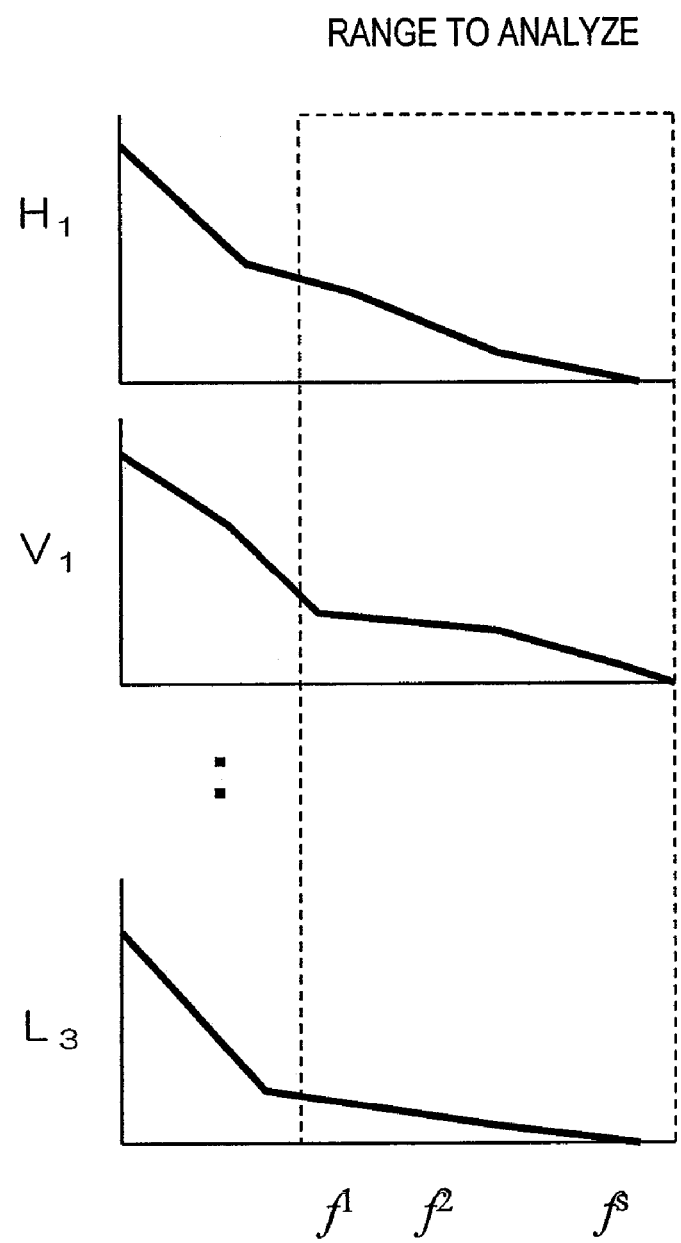
FIG. 6 shows the spectrum of frequencies that are equal to or higher than a predetermined value.

For example, as shown in FIG. 6, if the energy E of a spectrum, of which the frequencies are equal to or higher than a predetermined value, is calculated by the following Equation 1), then the ranges of the respective color channels of R, G and B can be distributed at the ratio of the magnitudes of those energies by the following Equation (2):

$$E_i = n_1 f^1 + n_2 f^2 + \ldots + n_n f^n \quad \text{Equation (1)}$$

$$w_R = \frac{E_R}{E_R + E_G + E_B} \quad \text{Equation (2)}$$

In Equation (1) or (2), f is the spatial frequency, $n_i$ is the frequency of occurrence of the spatial frequency $f^i$, and $w_R$, $w_G$ and $w_E$ are the range distribution ratios with respect to the R, G and B imaging sensors, respectively. If the A/D converter section 220 of each imaging sensor has the maximum data transfer rate p, then the data transfer rate $p_R$ of the R imaging sensor section 105 is represented by the following Equation (3):

$$p_R = w_R p \quad \text{Equation (3)}$$

In the same way, the data transfer rate $p_G$ of the G imaging sensor section 106 is represented by the following Equation (4):

$$p_G = w_G p \quad \text{Equation (4)}$$

And the data transfer rate $p_B$ of the B imaging sensor section 107 is represented by the following Equation (5):

$$p_B = w_B p \quad \text{Equation (5)}$$

The data transfer rates $p_R$, $p_G$ and $p_B$ of the R, G and B imaging sensor sections 105, 106 and 107 that have been determined in this manner are supplied as the color channel range distribution signal 230 shown in FIG. 1 to the respective binning sections 221 of the R, G and B imaging sensor sections 105, 106 and 107. As a result, the data transfer rate is controlled on a color channel basis.

The spectrum distribution of spatial frequencies in each of the R, G and B wavelength ranges depends on the type of the subject. That is why by recognizing the type of the subject, the pattern of its spatial frequency spectrum can be estimated, and the range distribution ratio of the color channel can be determined and/or calculated more simply. For example, if a blue background makes up the majority of the image capturing range, then the B image spatial frequency tends to be low, generally speaking. In that case, the data transfer rate $p_B$ of the B imaging sensor section 107 may be adjusted to the lowest one. In this manner, if the distribution of the data transfer rates is determined simply by the type (or the shooting mode) of a given subject, the processing to be done by the color channel range distribution calculating section 187 can be simplified.

The super-resolution section 240 increases the resolutions of the $R_1$, $G_1$ and $B_1$ images, and restores the spatial frequency components that have been lost as a result of the binning processing by the R, G and B imaging sensor sections 105, 106 and 107, thereby outputting an RGB image with high spatial resolution and high temporal resolution ($R_{OUT}$ $G_{OUT}$ $B_{OUT}$) 102.

From the standpoint of super-resolution processing, the binning processing corresponds to a resolution lowering process for lowering the spatial frequency. Generally speaking, the super-resolution processing is regarded as a reverse of the resolution lowering process. That is to say, if the processing to be carried out is an opposite type to the resolution lowering process, then the resolution should be able to be increased. That is why in designing the super-resolution processing, it is an important task to model the resolution lowering process. Stated otherwise, it is usually very difficult to design resolution raising process without clearly modeling the resolution lowering process. However, the binning processing to be done by the image data generator 700 is resolution lowering process itself, and there is no need to generate any model. Consequently, the super-resolution processing of quality can be carried out. For these reasons, the color channel range distribution calculating section 187 conveys the details of the binning processing as a binning processing detail signal 701 to the super-resolution section 240.

As can be seen from the foregoing description, the binning processing by the R, G and B imaging sensor sections 105, 106 and 107 and the super-resolution processing by the super-resolution section 240 are correlated with each other through the mediation of the color channel range distribution calculating section 187. Specifically, the color channel range distribution calculating section 187 controls the binning processing so as to leave as high spatial frequency components as possible with the upper limits of the data transfer rates of the R, G and B imaging sensor sections 105, 106 and 107 taken into consideration. At the same time, since the color channel range distribution calculating section 187 supplies the binning processing detail signal 701 to the super-resolution section 240, the spatial frequency decreasing model can be known and the spatial frequency components that have been lost as a result of the binning processing can be estimated more accurately. As a result, the upper limits of the data transfer rates of the R, G and B imaging sensor sections 105, 106 and 107 can be surpassed.

The output section 114 outputs the RGB image with high spatial resolution and high temporal resolution ($R_{OUT}$ $G_{OUT}$ $B_{OUT}$) 102, which has been supplied from the super-resolution section 240, to a device outside of the image data generator 700.

FIG. 7 shows the timings to operate the image data generator 700.

First, at a time t1, reading 710 is carried out to read the first pixel data from the R, G and B imaging sensor sections 105, 106 and 107. At this time, however, no spatial frequency analysis has been made yet, and therefore, no color channels can be subjected to the binning processing on an individual basis. That is why each color channel is subjected to 2×2 binning processing, thereby transferring data at the same rate over every color channel.

Next, at a time t2, reading 710 is carried on to read the second pixel data from the R, G and B imaging sensor sections 105, 106 and 107. At the same time, frequency analysis 711 is also carried out to make the spatial frequency calculating section 186 calculate the spatial frequency of the first pixel data. Since there is only one piece of pixel data available at this point in time, DC components are output as the spatial frequency. However, with the passage of time, an increasing number of pixel data will be accumulated one after another, and spatial frequencies representing a variation in luminance from neighboring pixels will be able to be calculated. When this processing is actually implemented, a number of pixel data will be stored in a memory once and then read and processed as will be described later. However, since the description of this example is focused on the timings of operation, it will not be described herein how to access the memory or how those pixel data should be handled but such physical implementation will be described later.

Next, at a time t3, while reading 710 and the frequency analysis 711 are carried on, range distribution 712 and super-resolution processing 714 are newly started. The range distribution 712 is performed by the color channel range distribution calculating section 187. At this point in time t3, ranges are distributed to the respective color channels with respect to the first pixel. The super-resolution processing 714 is performed by the super-resolution section 240. At this point in time t3, the super-resolution processing is carried out on the first pixel. If the first binning processing is 2×2 binning processing, for example, the super-resolution section 240 performs the processing of doubling the number of pixels both horizontally and vertically. When this processing is actually implemented, a number of pixel data will be stored in a memory once and then read and processed as will be described later. However, since the description of this example is focused on the timings of operation, it will not be described herein how to access the memory or how those pixel data should be handled but such physical implementation will be described later.

Next, at a time t4, while reading 710, frequency analysis 711, range distribution 712 and super-resolution processing 714 are carried on, binning processing 713 and image output 715 are newly started. The image output 715 is performed by the output section 114 so as to output the first pixel. On the other hand, the binning processing 713 is carried out by the R, G and B imaging sensor sections 105, 106 and 107 on the first pixel under the conditions that have been defined in accordance with the color channel range distribution signal 230 that has been supplied by the color channel range distribution calculating section 187. Since the binning processing becomes effective from the next time on, the binning processing is actually activated at the next time t5. The pixel data 716 that has been read (710) at the time t5 will go through frequency analysis 711, range distribution 712, super-resolution processing 714 and image output 715 with time and then will be output by the image data generator 700 at the time t8.

As can be seen from the foregoing description, if the time axis of the operating timing diagram shown in FIG. 7 is regarded as an operating clock signal for pipeline processing, there will be a time lag for four clock pulses after the image data has been read from the R, G and B imaging sensor sections 105, 106 and 107 and before their spatial frequency distribution is reflected on the binning processing. Also, there will be a time lag for three clock pulses after the image data generator 700 has been activated and before the first pixel data is output. After that, the same processing will be carried out on the respective color channels for four clock pulses that follow. And it is not until the fifth clock pulse is generated, or even later, that processing on respective color channels will be started. That is why the binning processing and the super-resolution processing on the respective color channels will get effective for the first time when the eighth clock pulse is generated. After that, every processing will be carried out on a clock pulse basis.

Embodiment 2

Figure 8:
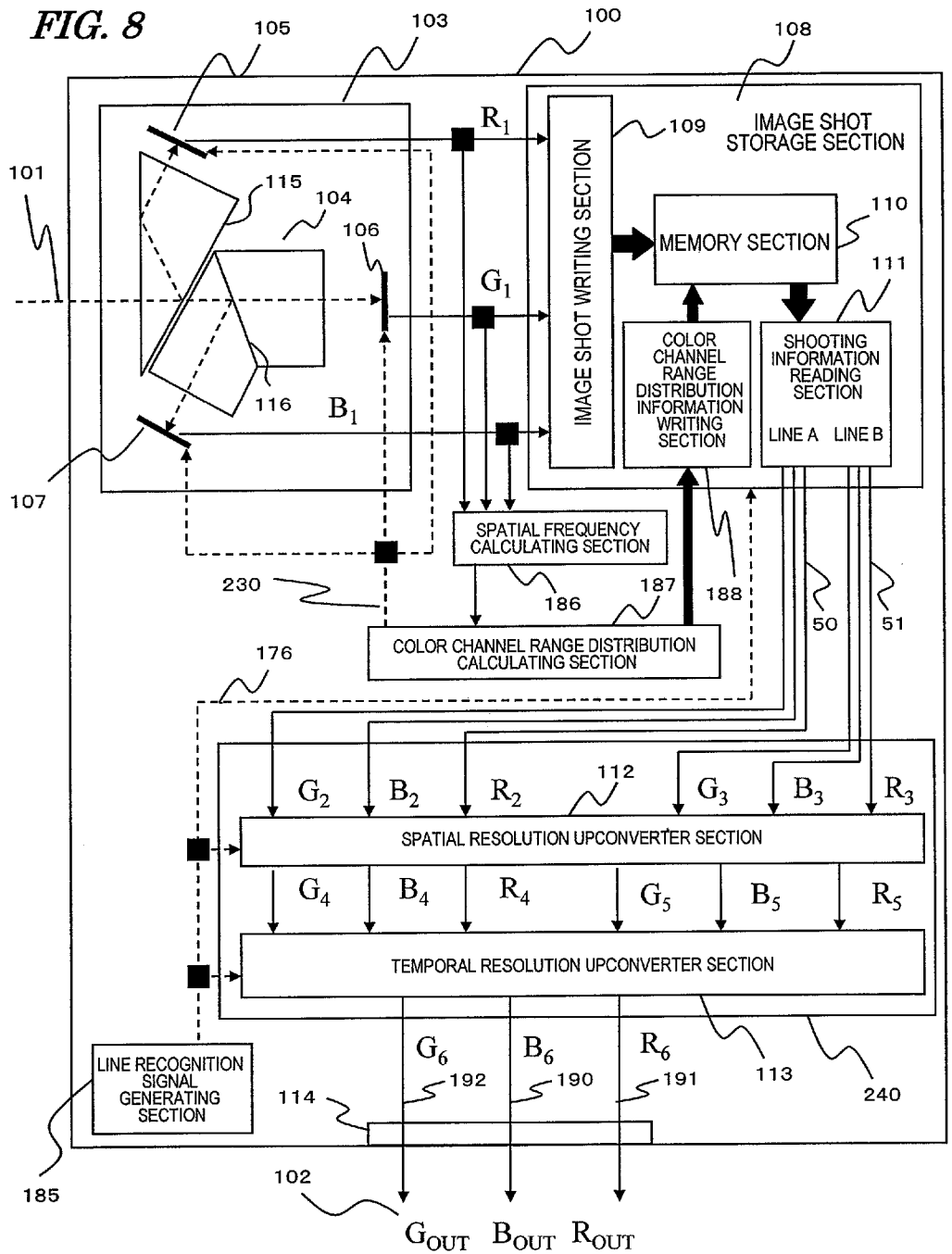
FIG. 8 is a block diagram illustrating a configuration for an image data generator 100 as a second specific preferred embodiment of the present invention.

FIG. 8 is a block diagram illustrating a configuration for an image data generator 100 as a second specific preferred embodiment of the present invention. In FIG. 8, any component also included in the image data generator 700 shown in FIG. 1 and having substantially the same function as its counterpart will be identified by the same reference numeral and the detailed description thereof will be omitted herein.

As shown in FIG. 8, the image data generator 100 includes the shooting section 103, the color separating section 104, the R imaging sensor section 105, the G imaging sensor section 106, the B imaging sensor section 107, an image shot storage section 108, an image shot writing section 109, the spatial frequency calculating section 186, the color channel range distribution calculating section 187, a color channel range distribution information writing section 188, a memory section 110, a shooting information reading section 111, the super-resolution section 240, the output section 114 and a line recognition signal generating section 185.

The image shot storage section 108 reads and writes the $R_1$, $G_1$ and $B_1$ images that have been supplied from the shooting section 102.

The image shot writing section 109, included in the image shot storage section 108, writes the $R_1$, $G_1$ and $B_1$ images on the memory section 110, thereby recording the image shots there.

The color channel range distribution information writing section 188, also included in the image shot storage section 108, writes the respective data transfer rates $p_R$, $p_G$ and $p_B$ of the R, G and B imaging sensor sections 105, 106 and 107 onto the memory section 110. In this case, the data transfer rates are written on the headers of the R, G and B images that have been written on the memory section 110 by the image shot writing section 109, thereby associating the image data and the data transfer rates with each other.

The shooting information reading section 111, also included in the image shot storage section 108, reads the R, G and B images from the memory section 110 through two lines (which will be referred to herein as "Line A 50" and "Line B 51", respectively). Line A 50 reads the R, G and B images from the memory section 110 so that the temporal resolution upconverter section 113 can learn the relation between a low-spatial-resolution image and a high-spatial-resolution image as will be described later. On the other hand, Line B 51 reads the R, G and B images from the memory section 110 to play back the image shots and output an RGB image with high spatial resolution and high temporal resolution ($R_{OUT}$ $G_{OUT}$ $B_{OUT}$) 102.

If the image shot writing section 109 writes the 24-bit R, G and B images with the spatial and temporal resolutions shown in FIG. 3 onto the memory section 110, then the data transfer rate will be 49 Mbps (=(1,920 pixels×1,080 lines×8 bits× 2)+(480 pixels×270 lines×8 bits×15)×2 channels). The shooting information reading section 111 also operates at the same data transfer rate. The data transfer rates of the R, G and B images are read from the headers of the respective images. As the memory section 110, any type of storage medium such as a hard disk that uses a magnetic material or a semiconductor memory may be used. If the storage medium is removable from the image data generator 100, then the image shots that have been taken with this image data generator 100 can be moved or copied to another device.

The super-resolution section 240 increases the resolutions of the R, G and B images that have been read from the image shot storage section 108, and includes a spatial resolution upconverter section 112 and a temporal resolution upconverter section 113.

Figure 9:
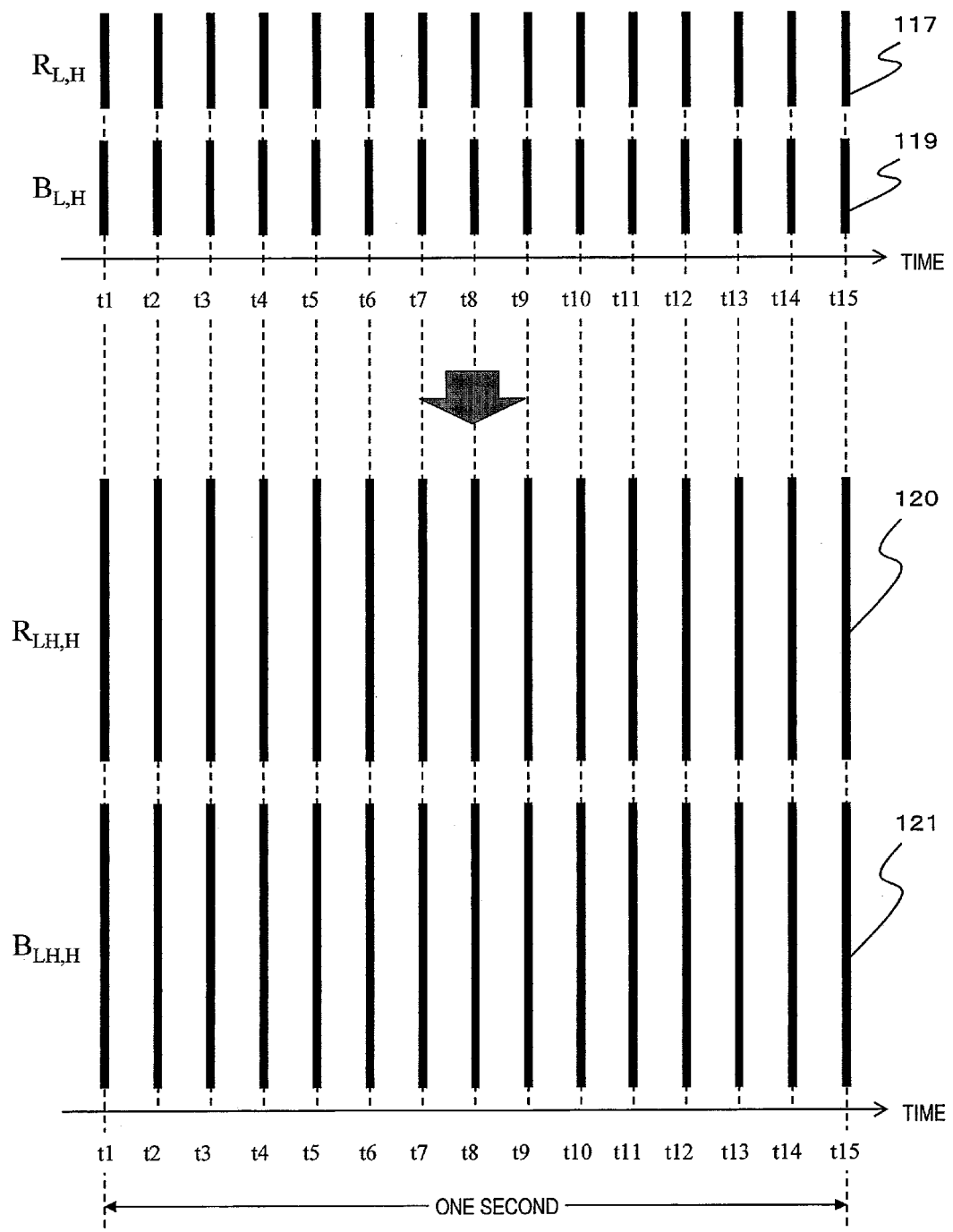
FIG. 9 schematically illustrates conceptually how the spatial resolution upconverter section 112 raises the spatial resolution of R and B images 117 and 119.

As shown in FIG. 9, the spatial resolution upconverter section 112 increases the spatial resolutions of the R and B images 117 and 119 and changes the number of pixels and the number of lines of the R and B images into 1,920 pixels×1,080 lines, which are the same as those of the G image 118, thereby outputting an R image 120 and a B image 121. To indicate that the spatial resolution has been increased, another subscript is added to the S and T subscripts. Specifically, the R image 120 that has had its spatial resolution increased is identified herein by $R_{LH,H}$ while the B image 121 that has had its spatial resolution increased is identified herein by $B_{LH,H}$.

On the other hand, the temporal resolution upconverter section 113 increases the temporal resolution of the G image 118, thereby outputting a G image 122 at a frame rate of 15 ftp, which is as high as that of the R and B images 117 and 119, as shown in a. The G image 122 that has had its temporal resolution increased is identified herein by $G_{H,LH}$.

The respective components of the image data generator 100 shown in FIG. 8, such as the image shot storage section 108, the spatial resolution upconverter section 112, and the temporal resolution upconverter section 113, could be implemented as circuit components that make a semiconductor integrated circuit, for example. Those components may be either integrated together on a single chip or provided as separate parts. Alternatively, the functions of those components may also be performed by a combination of a CPU (central processing unit) and a storage medium that has stored thereon a program to operate the CPU.

Figure 10:
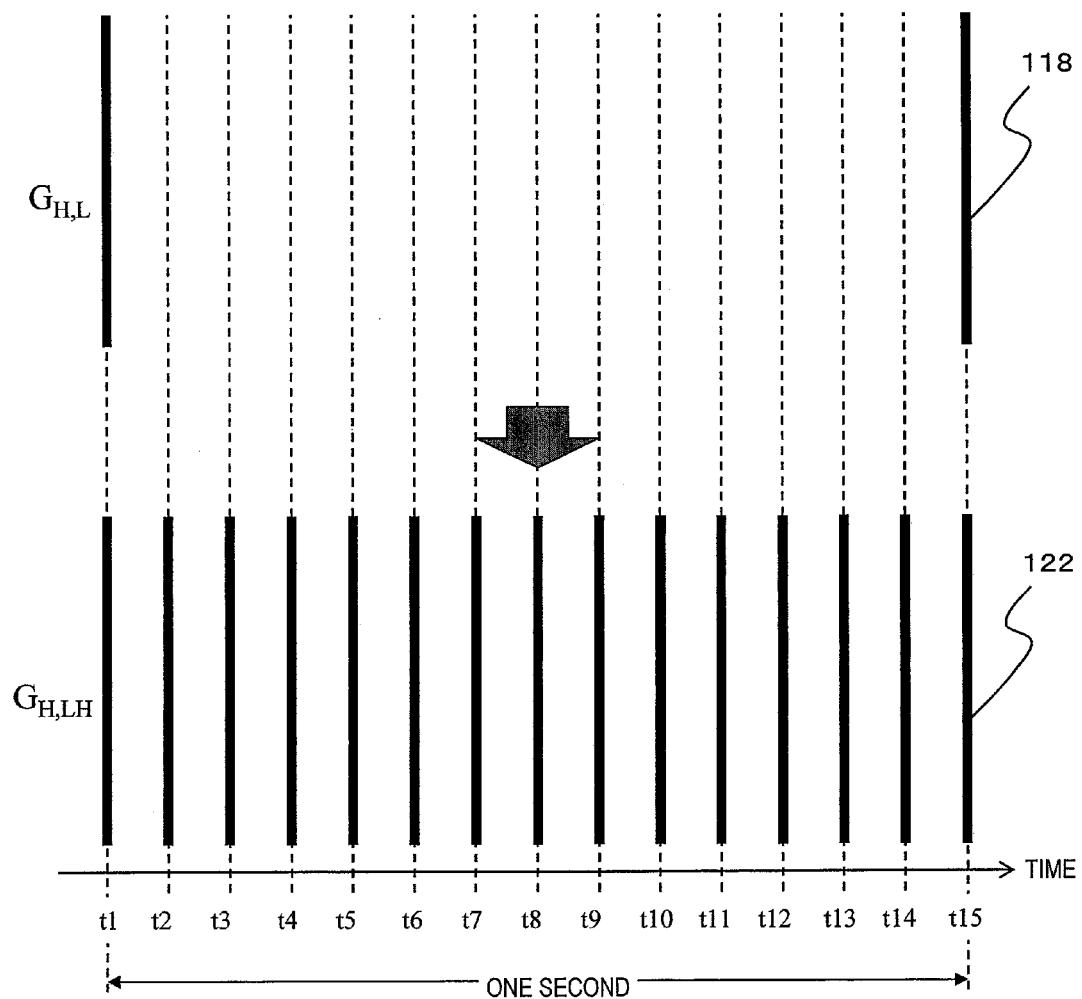
FIG. 10 schematically illustrates conceptually how the temporal resolution upconverter section 113 raises the temporal resolution of a G image 118.

FIG. 11 shows on what principle the temporal resolution upconverter section 113 generates the G image 122 (see FIG. 10). Specifically, FIG. 11(a) shows how to learn the relation between a low-spatial-resolution image and a high-spatial-resolution image in principle, while FIG. 11(b) shows how to generate the G image 122 in principle by reference to the relation between the spatial resolutions that has been learned.

In FIG. 11(a), the base image set 130 is a set of R, G and B images 117, 118 and 119 that have been acquired at the same time as t1 or t15 shown in FIG. 10. To tell "an R image 117 that covers the period from t1 through t15" from "an R image 117 at the time t1 or t15", the latter image will be referred to herein as an "R base image 131". Likewise, to avoid confusing "a G image 118 that covers the period from t1 through t15" from "a G image 118 at the time t1 or t15", the latter image will be referred to herein as a "G base image 132". And to distinguish "a B image 119 that covers the period from t1 through t15" from "a B image 119 at the time t1 or t15", the latter image will be referred to herein as a "B base image 133". Since the G image that remains a missing one from the time t2 through the time t14 is generated based on the G base image 132 in the base image set 130, the G base image 132 can be defined as a resource for generating the G image. To generate such a missing G image is equivalent to a problem for finding an appropriate G image generating resource from the G base image 132 based on the R and B images that are always captured from the time t2 through the time t14. That is why by using the base image set 130 that includes all of the R, G and B images, the relation between the low spatial resolution of the R and B base images 131 and 133 and the high spatial resolution of the G base image 132 is established and then stored in a G image generating database section 140.

To make the R and B base images 131 and 133 correspond with the G image, their spatial resolution may be increased by interpolation and expansion so that their number of pixels and number of lines agree with those of the G image. In this case, according to an upsampling technique by interpolation, the number of pixels and the number of lines are increased by interpolating pieces of existent information. That is why such a technique has a limit when it comes to generating high frequency components and will normally generate a somewhat blurred enlarged image. That is to say, according to a cubic convolution technique, by which the weights of two points that precede and succeed an interpolation point are determined by sinc function, the upper limit of a waveform frequency that can be restored by interpolation and expansion becomes a half as high as the sample rate. However, since the R and B images are just pieces of reference information for finding a resource for increasing the spatial resolution from the G image, there is no need to restore the high frequency components of an image with a high spatial resolution perfectly. For that reason, if an intermediate value can be calculated by applying the interpolation technique to the existent information, the resource for increasing the spatial resolution could be found from the G image.

The interpolated and expanded R and B images 134 and 135 and the G base image 132 are transformed into image feature quantities by a frequency analyzer. In FIG. 11, those image feature quantities are identified by f. For example, what is obtained by transforming $G_{H,L}$ into an image feature quantity is identified by $fG_{H,L}$. If the dimensional number of the image feature quantity is q, then $fG_{H,L}$ will have q images, each of which has the same image size as $G_{H,L}$.

Figure 12:
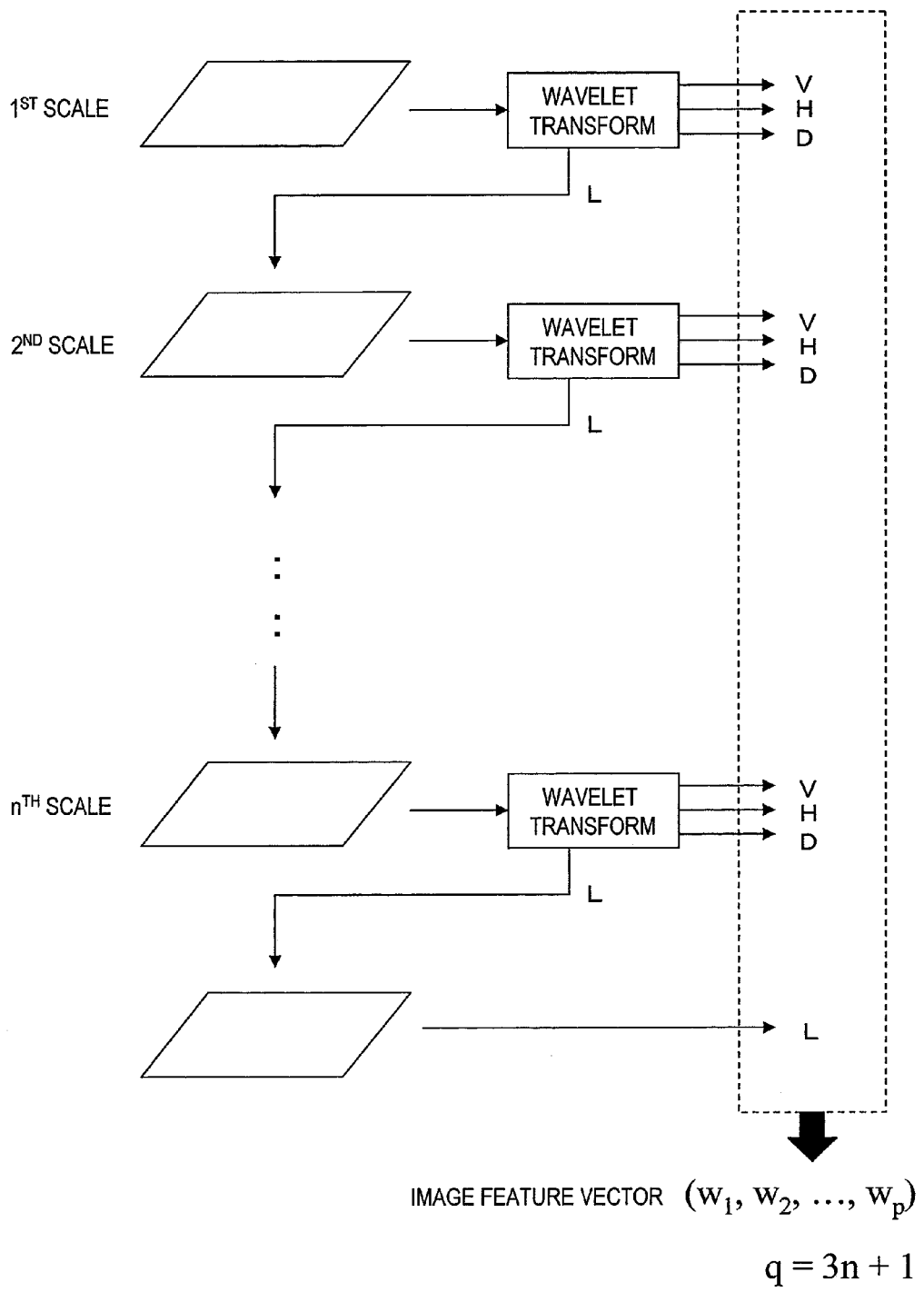
FIG. 12 illustrates how to represent an image feature vector by a multi-dimensional vector that uses the coefficients of a Wavelet transform as elements.

According to the present invention, the image feature quantity may be defined arbitrarily but could be represented by a multi-dimensional vector that uses the coefficients of Wavelet transform as elements as shown in FIG. 12. That is to say, by obtaining the outputs V, H, D and L of the Wavelet transform for each of a number n of scales and adding them together on a hierarchy basis, a (3n+1)-dimensional vector can be obtained. For example, if the scale level n is three, the image feature quantity will be ten-dimensional image feature vector $(w_1, w_2, \ldots, w_{10})$. Those outputs V, H, D and L of the Wavelet transform are coefficients to be obtained when the Haar mother Wavelet is adopted, and may be calculated by the same method as what has already been described with reference to FIGS. 5(a) and 5(b).

Figure 13:
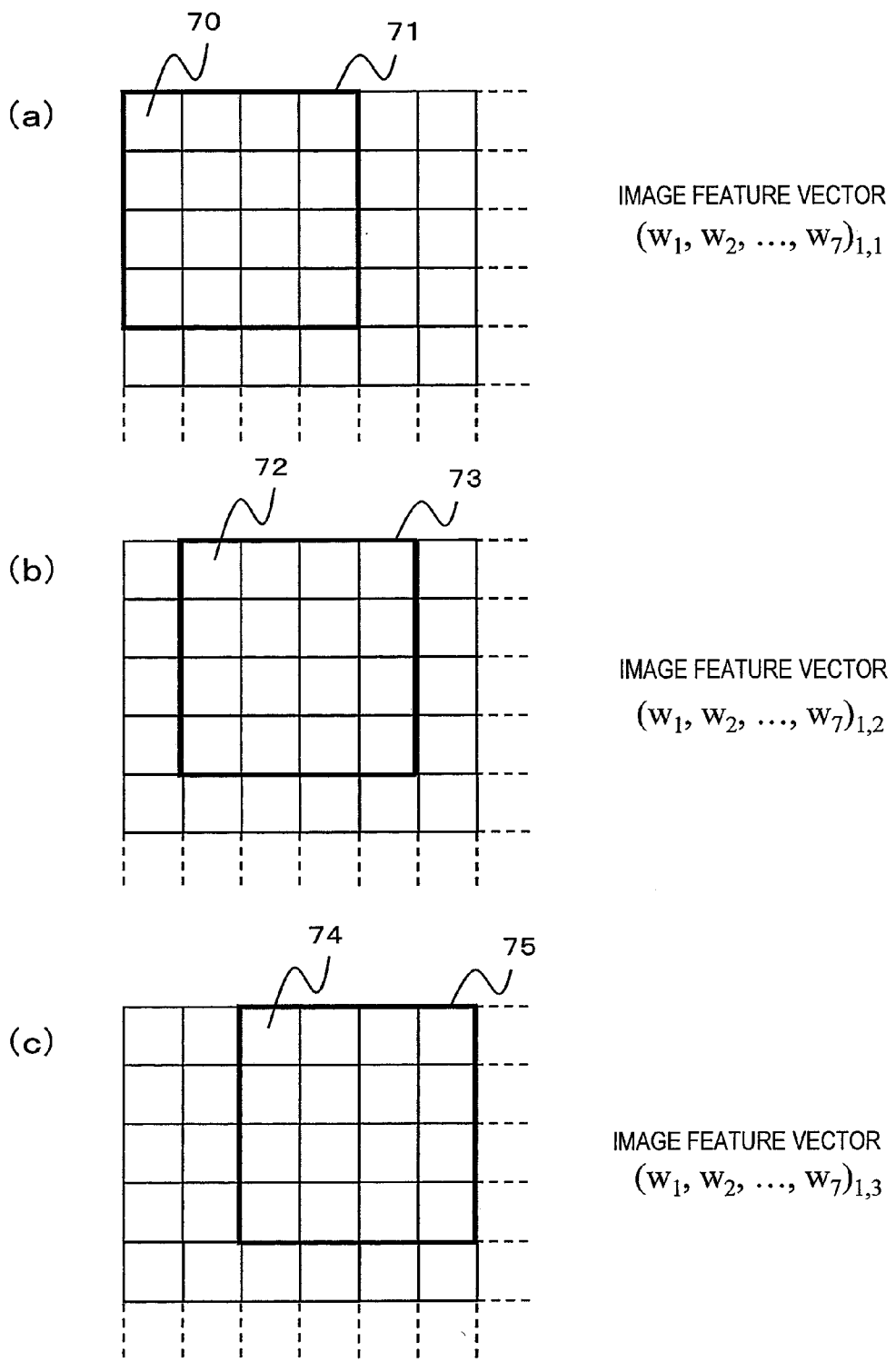
FIG. 13 illustrates how to calculate the image feature quantity on a pixel-by-pixel basis when the scale level n is two.

FIG. 13 illustrates how to calculate the image feature quantity on a pixel-by-pixel basis when the scale level n is two, for example. Specifically, FIG. 13(a) shows how to calculate the image feature quantity $(w_1, w_2, \ldots w_7)_{1,1}$ of a pixel 70. In this case, a seven-dimensional image feature quantity is calculated by the Wavelet transform with reference to the 16 pixels inside the block 71. Likewise, FIG. 13(b) shows how to calculate the image feature quantity $(w_1, w_2, \ldots w_7)_{1,2}$ of a pixel 72. In this case, a seven-dimensional image feature quantity is calculated by the Wavelet transform with reference to the 16 pixels inside the block 73. Furthermore, FIG. 13(c) shows how to calculate the image feature quantity $(w_1, w_2, \ldots w_7)_{1,3}$ of a pixel 74. In this case, a seven-dimensional image feature quantity is calculated by the Wavelet transform with reference to the 16 pixels inside the block 75. By shifting the Wavelet transform reference block on a pixel-by-pixel in this manner, the image feature quantity can be calculated for one pixel after another.

There are two low-spatial-resolution images (i.e., the R and B images in this case). That is why by combining the q-dimensional image feature vector R image 136 and the q-dimensional image feature vector B image 137 shown in FIG. 11 together, a 2q-dimensional image feature vector RB image 138 is obtained. Meanwhile, the G base image 132 is also transformed into an image feature quantity, thereby generating a q-dimensional image feature vector G image 139.

The G image generating database section 140 functions as a dictionary for associating the respective image feature quantities of the image feature vector RB image 138 and the image feature vector G image 139 at the same pixel location with each other and replacing a low-spatial-resolution image feature vector with a high-spatial-resolution image feature vector. In this preferred embodiment, G pixels are arranged as a matrix of 1920 pixels×1,080 lines, and therefore, approximately 2.07 million sets of image feature vector replacement information are stored in the G image generating database section 140. Also, since two pictures of the G image are obtained at the times t1 and t15, the number of pieces of image feature vector replacement information that can be referred to in order to increase the spatial resolution becomes approximately 4.14 million. That is to say, the G image that becomes a missing one from the time t2 through the time t14 is filled with some of the 4.14 million G image feature vectors.

In FIG. 11(*b*), the image set 150 includes R and B images 151 and 152 from the time t2 through the time t14. The R and B images 151 and 152 are converted by the same interpolation and expansion method as the one shown in FIG. 11(*a*) to have the same number of pixels and the same number of lines as the G image, thereby generating R and B images 153 and 154. Next, the R and B images 153 and 154 are transformed into image feature quantities by the same method as the one shown in FIG. 11(*a*), thereby generating a q-dimensional image feature vector R image 155 and a q-dimensional image feature vector B image 156. These q-dimensional image feature vector R and B images 155 and 156 are combined with each other to produce a 2p-dimensional image feature vector RB image 157. Then, the degree of similarity of image feature vector between the 2p-dimensional image feature vector RB image 157 and a 2q-dimensional image feature vector RB image 138 in the G image generating database section 140 is determined, thereby selecting a similar RB image feature vector 158. Subsequently, an image feature vector at the same pixel location as the similar RB image feature vector 158 is extracted from the image feature vector G image 139 and used as a similar G image feature vector 159.

Any arbitrary method may be used to select the similar RB image feature vector 158. For example, an image feature vector that has the shortest distance from the 2p-dimensional image feature vector RB image 157 may be selected from the G image generating database section 140. Alternatively, a number of candidate image feature vectors, of which the distances from the 2q-dimensional image feature vector RB image 157 are shorter than a predetermined reference distance, may be extracted, image feature vectors at the same pixel locations as those candidate image feature vectors extracted are picked from the image feature vector G image 139, and then those two groups of image feature vectors are averaged to obtain similar G image feature vectors 159.

Still alternatively, a few (e.g., three) candidate image feature vectors, of which the distances from the 2q-dimensional image feature vector RB image 157 are the shortest, the second shortest and the third shortest, respectively, may be extracted, image feature vectors at the same pixel locations as those candidate image feature vectors extracted are picked from the image feature vector G image 139, and then those two groups of image feature vectors are averaged to obtain similar G image feature vectors 159.

The similar G image feature vector 159 is an image feature quantity with high spatial resolution. And since the similar RB image feature vector 158 has been replaced with the similar G image feature vector 159, the spatial resolution has been raised. At every pixel of the image feature vector RB image 157, the similar RB image feature vector 158 has been replaced with the similar G image feature vector 159 with reference to the G image generating database section 140, thereby generating a replaced image feature vector G image 160. Then, the replaced image feature vector G image 160 is subjected to the inverse one of the image feature quantity transform so as to be restored into a luminance image and generate a replaced and resolution increased G image 161. By calculating the replaced and resolution increased G image 161 from the time t2 through the time t14, the G image 122 shown in FIG. 10 is generated and the temporal resolution can be increased.

In FIG. 11, the image size of the R image 131 is determined by the parameters of the binning processing to be carried out on the R imaging sensor section 105. Likewise, the image size of the B image 133 is determined by the parameters of the binning processing to be carried out on the B imaging sensor section 107. That is why although the R and B images 131 and 133 may have different image sizes, those image sizes are eventually unified into that of the G image, which is a high-resolution image, by interpolation and expansion. Consequently, the image sizes of the R and B images 134 and 135 agree with each other.

Figure 14:
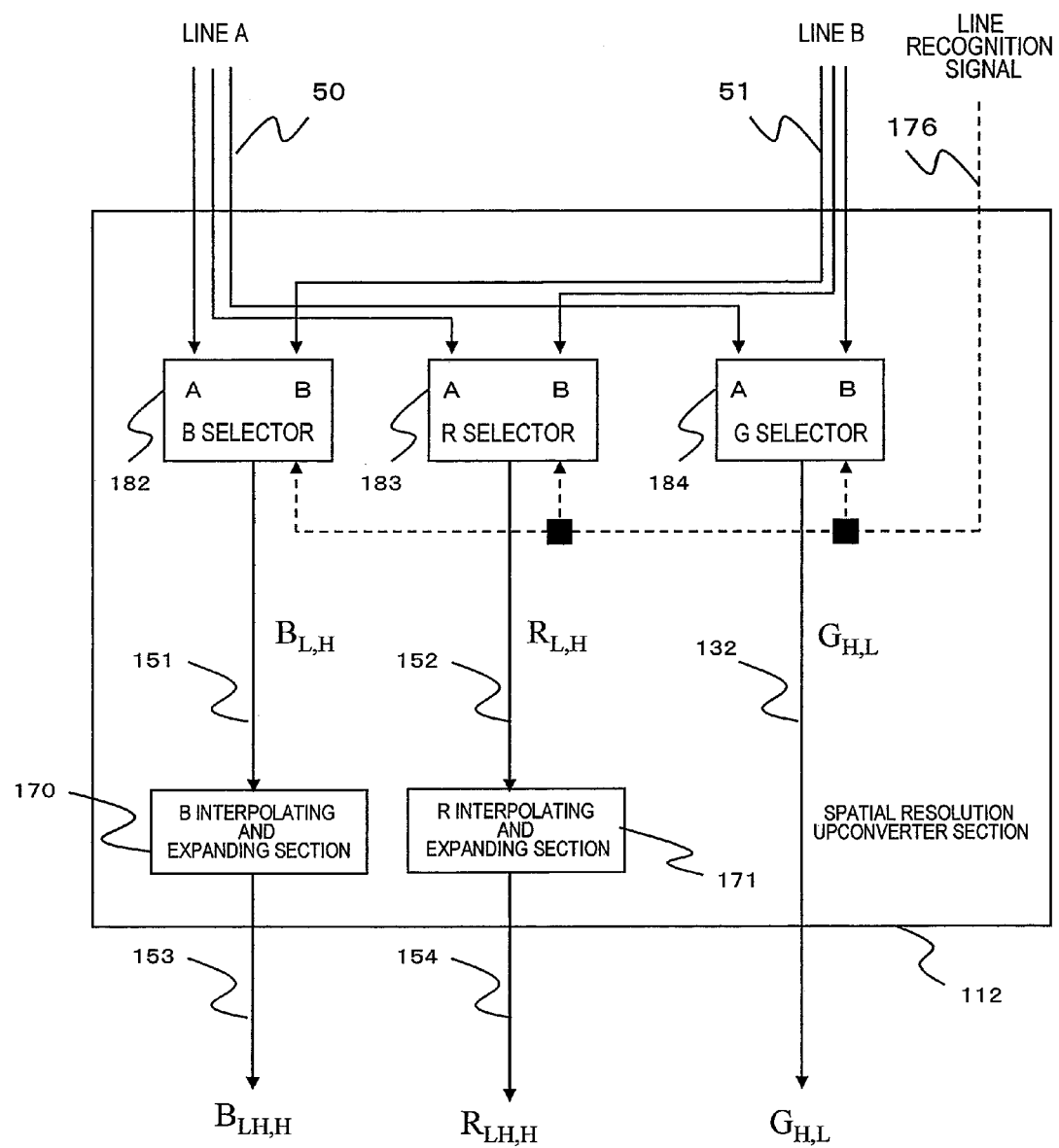
FIG. 14 is a block diagram illustrating a configuration for the spatial resolution upconverter section 112.

FIG. 14 is a block diagram illustrating a configuration for the spatial resolution upconverter section 112. The inputs from the Line A 50 and the Line B 51 are switched by B, R and G selectors 182, 183 and 184 in accordance with a line recognition signal 176. A B interpolating and expanding section 170 increases the spatial resolution of the low-spatial-resolution, high-temporal-resolution B image 151 by interpolation and expansion, thereby outputting a high-spatial-resolution, high-temporal-resolution B image 153. Likewise, an R interpolating and expanding section 171 increases the spatial resolution of the low-spatial-resolution, high-temporal-resolution R image 152 by interpolation and expansion, thereby outputting a high-spatial-resolution, high-temporal-resolution R image 154. However, the high-spatial-resolution, low-temporal-resolution G image 132 included in the base image 130 shown in FIG. 11(*a*) does not have to have its resolution increased while an image shot is being played back. That is why the high-spatial-resolution, low-temporal-resolution G image 132 is just output as it is through the spatial resolution upconverter section 112. Optionally, the B interpolating and expanding section 170 and the R interpolating and expanding section 171 may be combined with each other so that the B image, and then the R image, are interpolated and expanded time-sequentially.

Figure 15:
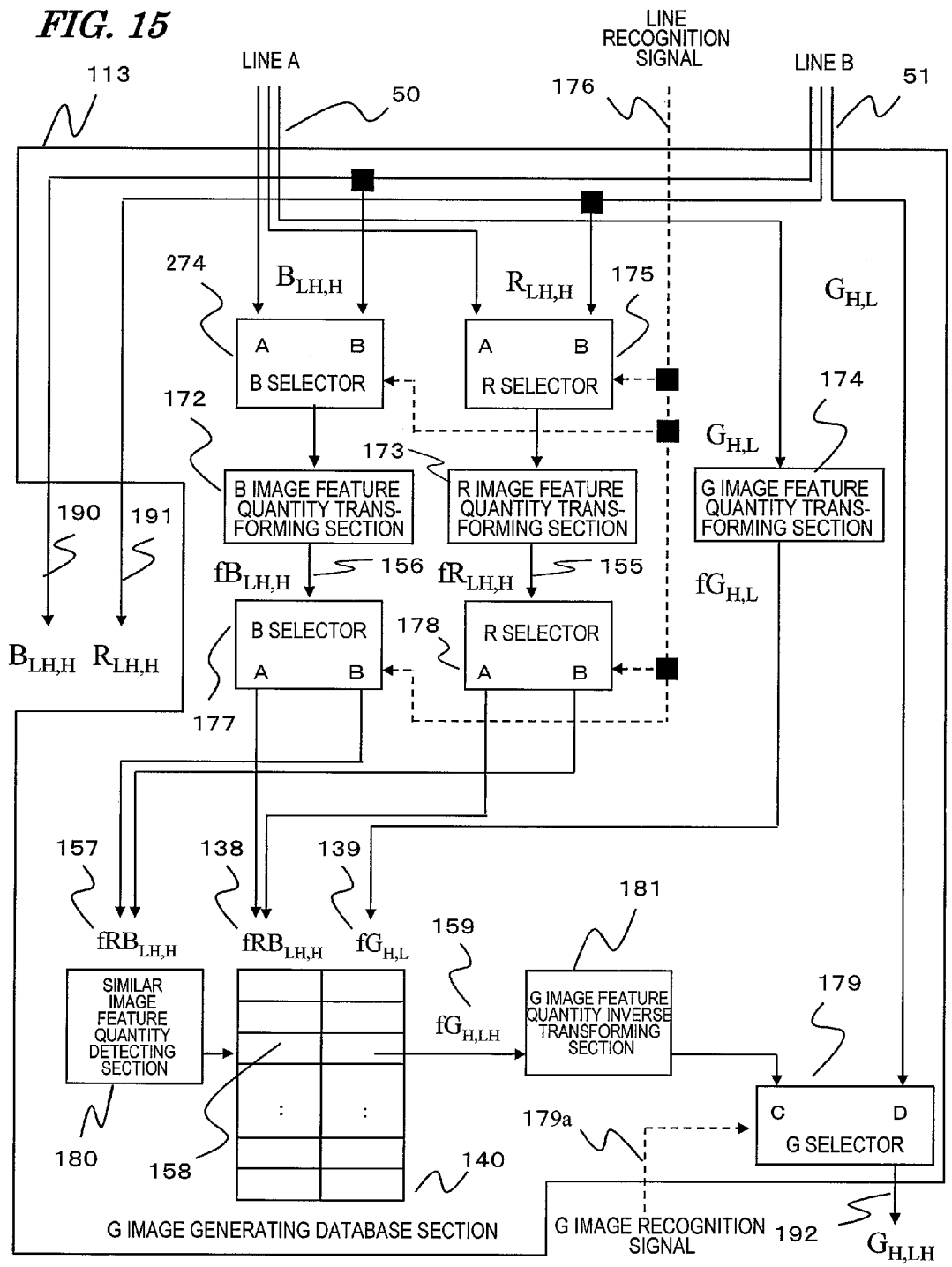
FIG. 15 is a block diagram illustrating a configuration for the temporal resolution upconverter section 113.

FIG. 15 is a block diagram illustrating a configuration for the temporal resolution upconverter section 113.

To generate a database for the G image generating database section 140, the Line A 50 supplies the image shot, which has been read from the memory section 110 shown in FIG. 8, to B, R and G image feature quantity transforming sections 172, 173 and 174. Among these three transforming sections, the B and R image feature quantity transforming sections 172 and 173 are also supplied with an image shot by the Line B 51 while the image shot is being played back, as will be described later. That is why the image shots supplied from the Line A 50 and the Line B 51 are switched by a B selector 274 and an R selector 175. The inputs to the selectors may be switched in accordance with the line recognition signal 176 so that the input from either the Line A 50 or the Line B 51 is supplied to the B and R image feature quantity transforming sections 172 and 173.

The image shot that has been read from the memory section 110 shown in FIG. 8 is converted into an image feature vector by the B or R image feature quantity transforming section 172 or 173, which is passed through the B selector 177 or R selector 178 and then provided for the input end of the G image generating database section 140. That image feature vector corresponds to the image feature quantity of the image feature vector RB image 138 shown in FIG. 11(*a*). On the other hand, the output of the G image feature quantity transforming section 174 is provided for the output end of the G image generating database section 140. This corresponds to the image feature vector of the image feature vector G image 139 shown in FIG. 11(*a*).

By performing these operations, the association between the low-spatial-resolution image and the high-spatial-resolution image shown in FIG. 11(*a*) has been learned completely. As the G image generating database section 140, any arbitrary storage medium such as a hard disk that uses a magnetic material or a semiconductor memory can be used. If the storage medium used is removable from the apparatus 100 for shooting, recording and playing an image, the data in the G image generating database section 140 can be either moved or copied to another device. Optionally, instead of such a removable storage medium, an interface having the ability to communicate with the network can also be used.

Meanwhile, the Line B 51 supplies the image shot that has been read from the memory section 110 while the image shot is being played to the temporal resolution upconverter section 113. Since the G image 118 with high spatial resolution is captured at the times t1 and t15 shown in FIG. 3, the temporal resolution upconverter section 113 does not have to generate the G image. That is why if there is such a G image 118 with high spatial resolution as seen at the times t1 and t15 shown in FIG. 3, then the G image 118 is just output as it is. On the other hand, if the G image 118 is missing as seen from the time t2 through the time t14 shown in FIG. 3, a G image 122 with high spatial resolution such as the G image 122 shown in FIG. 10 should be generated. To change these modes, the G selector 179 is used and a G image recognition signal 179*a* is given to indicate whether or not there is any G image 118.

The R and B images that have been supplied through the Line B 51 have had their spatial resolution once increased by the spatial resolution upconverter section 112 and correspond to the R and B images 153 and 154 shown in FIG. 11. These images are just output as they are (i.e., an output B image 190 and an output R image 191) from the temporal resolution upconverter section 113. At the same time, to generate the replaced and resolution increased G image 161 shown in FIG. 11, those images are also supplied to the B and R image feature quantity transforming sections 172 and 173 by way of the B and R selectors 274 and 175, respectively. The B image feature quantity transforming section 172 outputs the image feature vector B image 156 shown in FIG. 11(*b*), while the R image feature quantity transforming section 173 outputs the image feature vector R image 155 shown in FIG. 11(*b*). Thereafter, these image feature vector R and B images 155 and 156 are combined with each other by the similar image feature quantity detecting section 180 to be an image feature vector RB image 157.

Subsequently, the image feature vector RB image 157 has its distance compared to that of the image feature vector RB image 138 that has been written on the input end of the G image generating database section 140 through the Line A 50, thereby detecting a similar RB image feature vector 158. Also, the G image feature vector that has been stored at the output end of the G image generating database section 140 is output as the similar G image feature vector 159, which is restored by the G image feature quantity inverse transforming section 181 into a luminance image, thereby obtaining an output G image 192.

The line recognition signal generating section 185 generates the line recognition signal 176 and supplies it to the image shot storage section 108, the spatial resolution upconverter section 112 and the temporal resolution upconverter section 113. In the image shot storage section 108, the image shot reading section 111 changes the sources of reading from the Line A 50 into the Line B 51, or vice versa, in response to the line recognition signal 176. The spatial resolution upconverter section 112 and the temporal resolution upconverter section 113 also change the sources from the input through the Line A 50 into the input through the Line B 51, or vice versa. If the line recognition signal 176 has specified the Line A 50, the image shot reading section 111 retrieves only the base image set 130 shown in FIG. 5(*a*) from the memory section 110, the spatial resolution upconverter section 112 equalizes the spatial resolution of the R and B images with that of the G image by interpolation and expansion, and the temporal resolution upconverter section 113 stores the image feature vector RB image 138 and the image feature vector G image 139 on the G image generating database section 140. On the other hand, if the line recognition signal 176 has specified the Line B 51, the image shot reading section 111 sequentially retrieves one image shot after another from the memory section 110, the spatial resolution upconverter section 112 equalizes the spatial resolution of the R and B images with that of the G image by interpolation and expansion, and the temporal resolution upconverter section 113 generates the replaced and resolution increased G image 161 with reference to the G image generating database section 140.

In the example that has already been described with reference to FIG. 11, the base image set 130 is supposed to be obtained at either the time t1 or the time t15. However, the information that has been acquired at both of these times t1 and t15 could be introduced into the base image set 130 as well. That is to say, any number of pictures could be put into the base image set 130 according to the present invention.

Likewise, according to the present invention, a number of pictures may be introduced into the base image set at any time interval.

Also, if the image feature quantities in the G image generating database section 140 are similar to each other and have a high degree of redundancy, then the size of the G image generating database section 140 may be reduced by performing a clustering process that aggregates a number of similar data into a single piece of representative data. For example, if three base images, each consisting of 720 pixels×480 lines, are used and if the number of scales shown in FIG. 6 is three, then approximately one million (=720 pixels×480 lines× three) sets of 10-dimensional image feature vectors would be calculated. In that case, 10 thousand image feature vectors may be defined around an initial cluster by using random numbers generated, for example, and an image feature vector that is closest to the one at the center of each cluster is detected from the one million image feature vectors. Then, the average between the image feature vector detected and the one at the center of the cluster is calculated to update the center of the cluster. In this manner, the center of the cluster is repeatedly updated until the average between every single one of the one million image feature vectors and the one at the center of the cluster is calculated, thereby eventually obtaining 10 thousand image feature vectors. Optionally, clustering could be replaced with a main component analysis. In that case, the breadth of the distribution of those one million image feature vectors may be represented by a linear combination of multiple base vectors, thereby cutting down the degree of redundancy.

Figure 16:
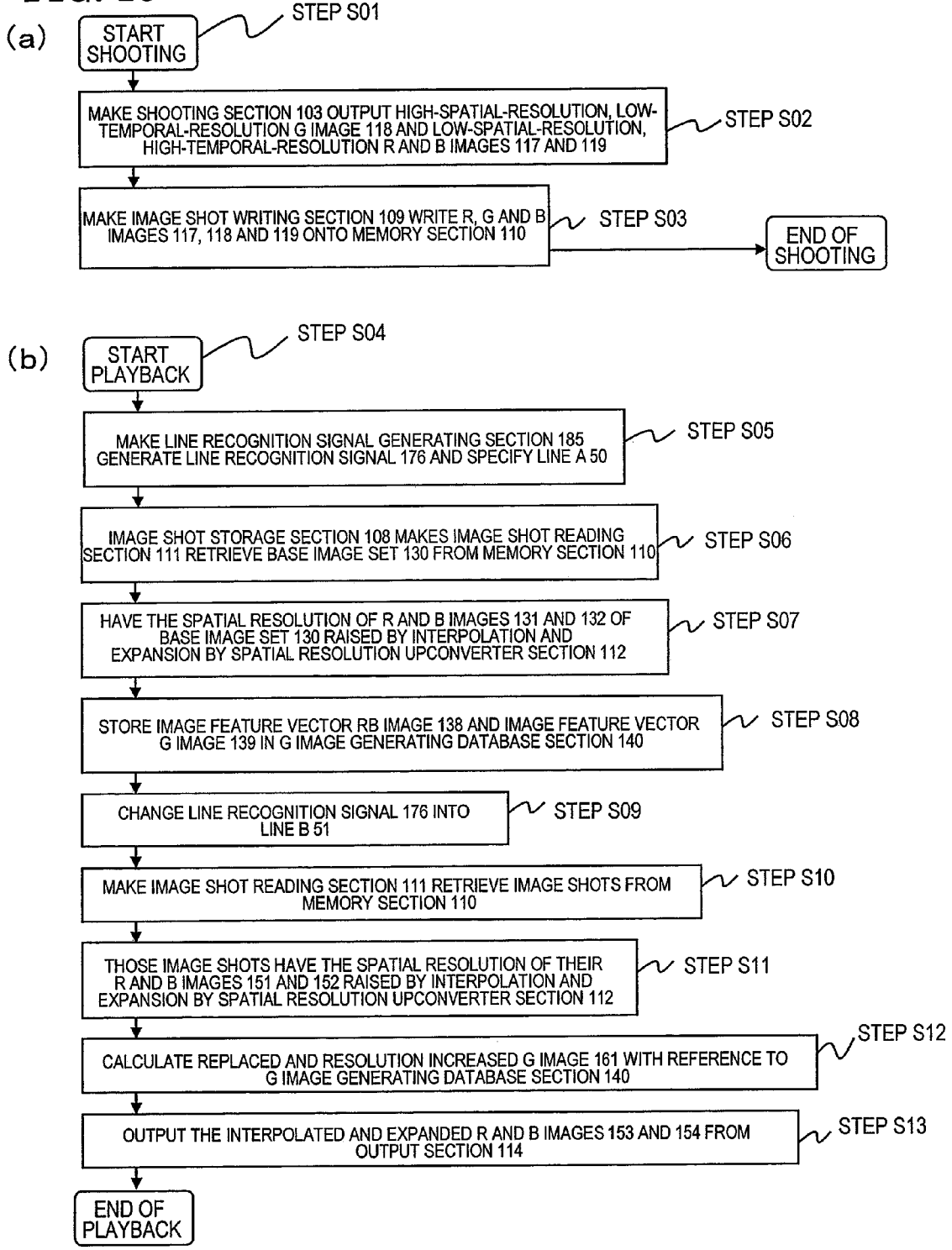
FIG. 16 shows the flows of operations to be done by the image data generator 100.

FIG. 16 shows the flows of operations to be done by the image data generator 100. Specifically, FIG. 16(*a*) is a flowchart showing the procedure of shooting and recording operations. On the other hand, FIG. 16(*b*) is a flowchart showing the procedure of operations for playing back an image shot. In FIG. 16(*a*), when shooting is started (in Step S01), the shooting section 103 receives the incoming light 101 and outputs the high-spatial-resolution, low-temporal-resolution G image 118, and the low-spatial-resolution, high-temporal-resolution R and B images 117 and 119 (in Step 802). Next, the image shot storage section 108 makes the image shot writing section 109 write the R, G and B images 117, 118 and 119 onto the memory section 110 (in Step S03). In FIG. 16(b), when the image shot starts to be played (in Step S04), the line recognition signal generating section 185 generates a line recognition signal 176 and specifies the Line A 50 (in Step S05). Then, the image shot storage section 108 makes the image shot reading section 111 retrieve the base image set 130 from the memory section 110 (in Step S06). Next, the base image set 130 has the spatial resolution of its R and B images 131 and 132 raised by interpolation and expansion by the spatial resolution upconverter section 112 (in Step S07). As a result, the image feature vector RB image 138 and the image feature vector G image 139 are stored in the G image generating database section 140 of the temporal resolution upconverter section 113 (in Step S08).

After the processing step S08 has been performed, the line recognition signal generating section 185 changes the levels of the line recognition signal 176 into the Line B 51 (in Step S09). The image shot storage section 108 makes the image shot reading section 111 retrieve one image shot after another from the memory section 110 (in Step S10). Next, those image shots have the spatial resolution of their R and B images 151 and 152 raised by interpolation and expansion by the spatial resolution upconverter section 112 (in Step S11). The replaced and resolution increased G image 161 is calculated with reference to the G image generating database section 140 of the temporal resolution upconverter section 113 (in Step S12) and then output, along with the interpolated and expanded R and B images 153 and 154, from the output section 114.

If the image feature vectors that are kept on record in the G image generating database section 140 are retained even after the playback operation has been finished, then the playback operation can be started next time by performing the processing step S09 with the processing steps S05 through S08 omitted. Particularly if the same scene is going to be shot again, the image feature vectors in the G image generating database section 140 are likely to be used again. That is why the image can be played back quickly without debasing the quality of the high-spatial-resolution, high-temporal-resolution RGB image ($R_{OUT} G_{OUT} B_{OUT}$) 102. When another base image set 130 is newly retrieved from the memory section 110, the lines are changed into the Line A 50 and the processing steps S05 through S08 are performed, thereby updating the image feature vectors in the G image generating database section 140.

With such an image data generator 100, an image of quality (i.e., with high spatial resolution and high temporal resolution) can be shot, recorded and played using a currently available three-panel camera as it is. For example, a high definition video with a resolution of 1,920 pixels×1,080 lines can be shot with a camcorder for a normal TV set with a resolution of 720 pixels×480 lines. Photoelectric transducer units for a normal TV set are greater in size than ones for a high-definition camcorder, thus allowing the user to shoot an image with high sensitivity more easily.

Embodiment 3

Next, a third preferred embodiment of an image data generator according to the present invention will be described.

The image data generator of this preferred embodiment uses the spatial frequency of an image shot for not only distributing the ranges of respective color channels but also performing super-resolution processing to restore the spatial frequency components that have been lost as a result of the binning processing, unlike the first and second preferred embodiments described above.

Figure 17:
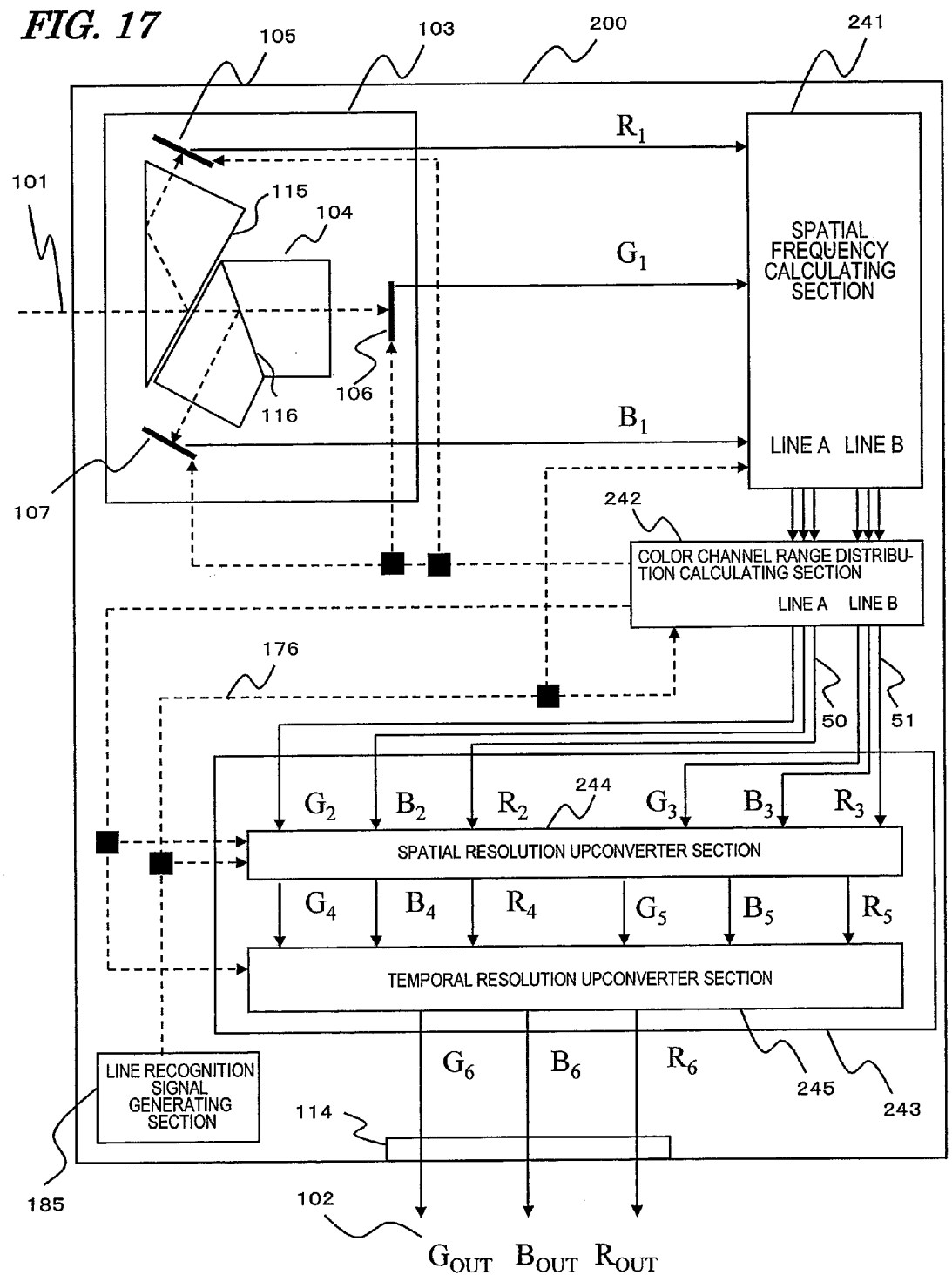
FIG. 17 is a block diagram illustrating a configuration for an image data generator 200 as a third specific preferred embodiment of the present invention.

FIG. 17 is a block diagram illustrating a configuration for an image data generator 200 as a third specific preferred embodiment of the present invention. In FIG. 17, any component also included in the image data generator 100 shown in FIG. 8 and having substantially the same function as its counterpart will be identified by the same reference numeral and the detailed description thereof will be omitted herein. The image data generator 200 includes the shooting section 103, the color separating section 104, the R imaging sensor section 105, the G imaging sensor section 106, the B imaging sensor section 107, a spatial frequency calculating section 241, a color channel range distribution calculating section 242, a super-resolution section 243, the output section 114 and the line recognition signal generating section 185.

Figure 18:
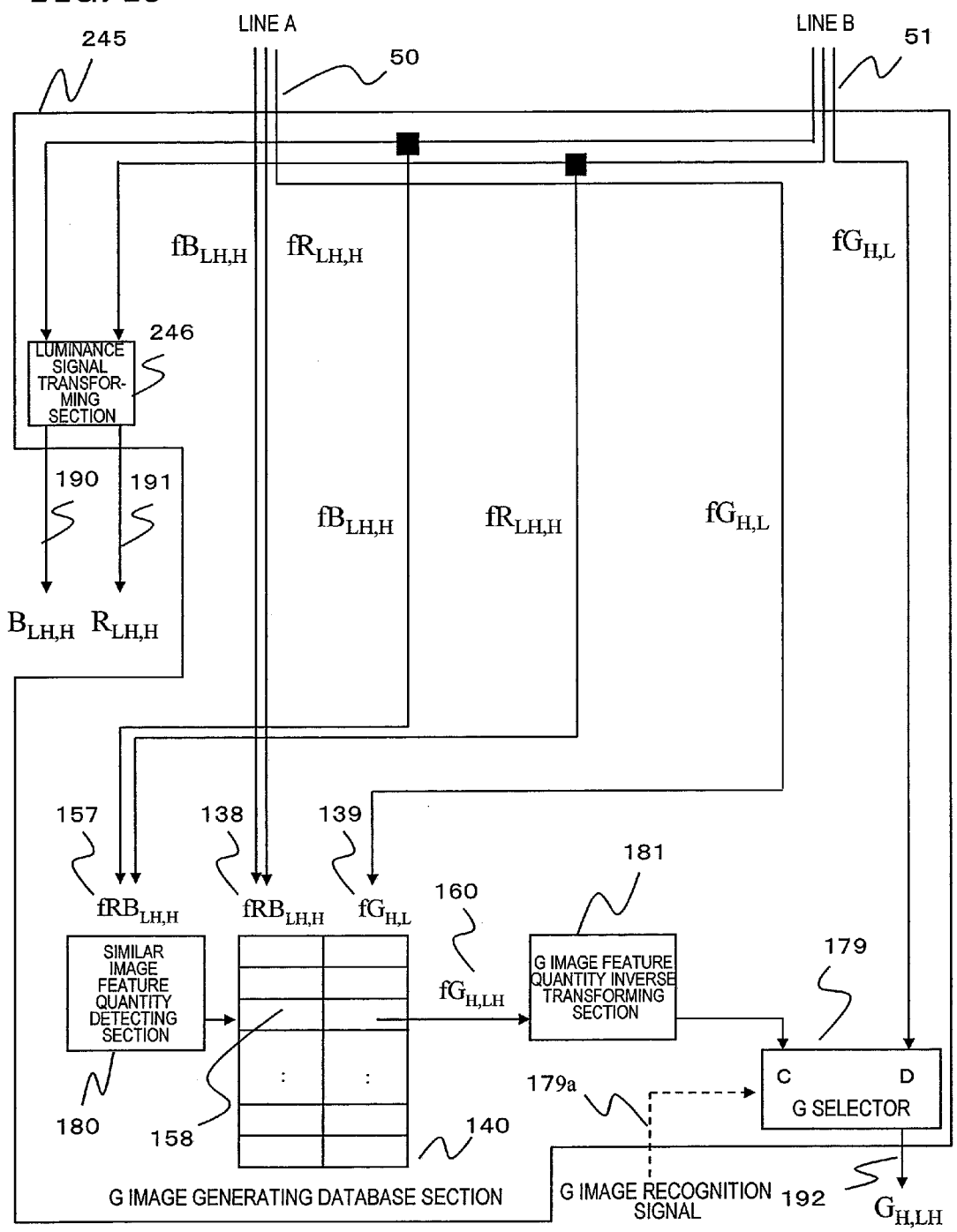
FIG. 18 is a block diagram illustrating a configuration for the temporal resolution upconverter section 245.

Just like the spatial frequency calculating section 186 shown in FIG. 8, the spatial frequency calculating section 241 calculates the spatial frequency distributions of the $R_1$, $G_1$ and $B_1$ images. In this preferred embodiment, however, the spatial frequency distribution thus calculated is used for not only getting the binning processing done on the photoelectric transducer units by the color channel range distribution calculating section 242 but also getting the resolution raised by the super-resolution section 243 as well. That is to say, the temporal resolution upconverter section 113 that has already been described with reference to FIG. 15 also raises the resolution using the image feature quantities in this preferred embodiment. However, in this preferred embodiment, it is the spatial frequency calculating section 241 that calculates the spatial frequency as an image feature quantity. That is why there is no need to provide any image feature quantity transforming section in the temporal resolution upconverter section 245. FIG. 18 is a block diagram illustrating the temporal resolution upconverter 245. Compared to the temporal resolution upconverter section 113 shown in FIG. 15, this temporal resolution upconverter 245 has a simplified structure because the upconverter 245 no longer needs to calculate image feature quantities. Nevertheless, since the output B and R images 190 and 191 are output as they are without being subjected to the resolution raising processing, a luminance signal transforming section 246 should be provided to transform the image feature quantity into a luminance signal.

It should be noted that FIG. 17 is drawn for the purpose of illustrating the shooting function of this preferred embodiment and does not illustrate components for performing the recording function as explicitly as in FIG. 8. The function of selecting either the Line A for outputting super-resolution learning images from the image shot storage section 108 shown in FIG. 8 or the Line B for passing images to have the super-resolution is introduced into the spatial frequency calculating section 241 in the exemplary configuration shown in FIG. 17.

To determine the parameters of the binning processing, the color channel range distribution calculating section 242 gives the range distribution information of the respective color channels to not only the shooting section 103 but also the spatial resolution upconverter section 244 and the temporal resolution upconverter section 245 as well. And the range distribution information is used to perform the super-resolution processing on a low-resolution image.

Figure 19:
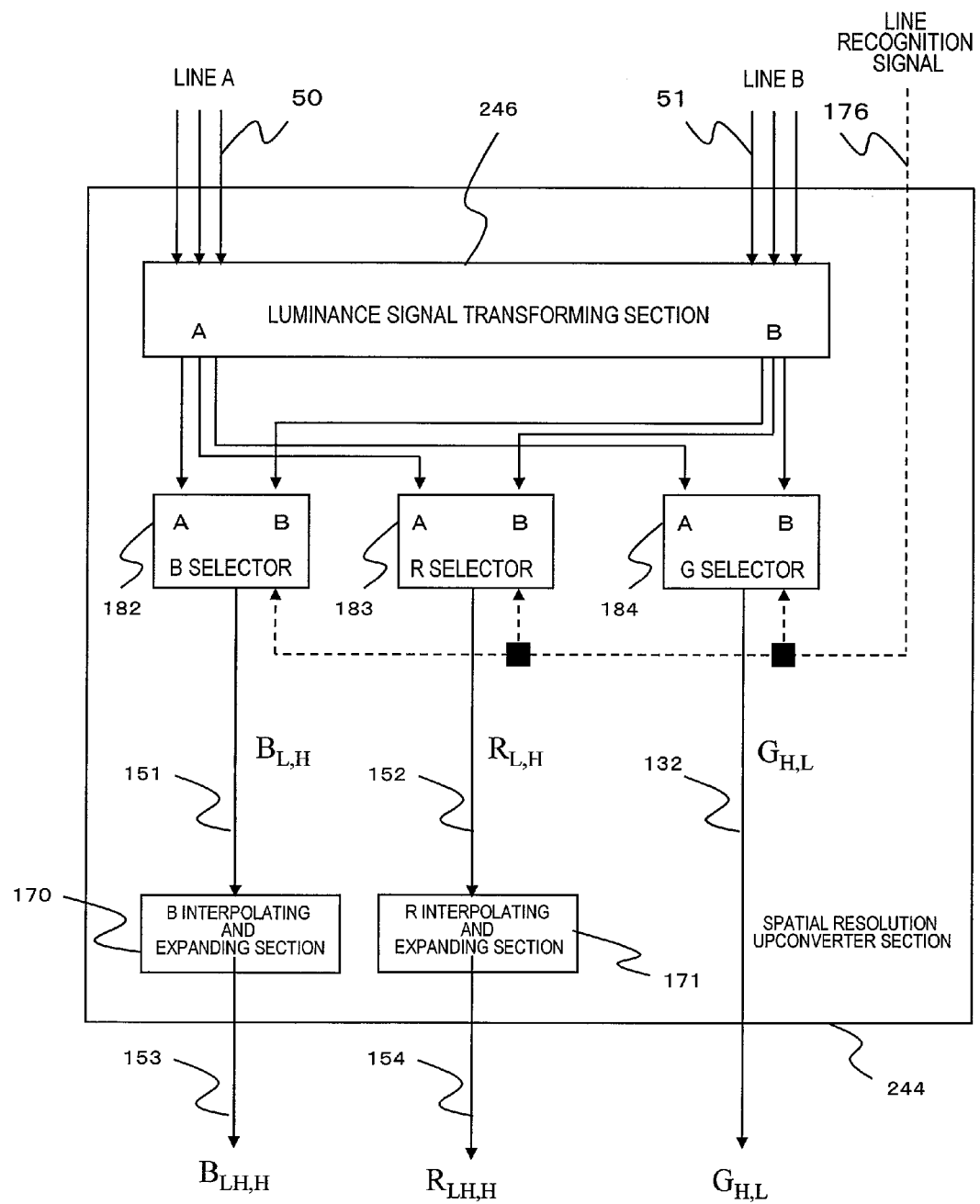
FIG. 19 is a block diagram illustrating a configuration for the spatial resolution upconverter section 244.

Just like the spatial resolution upconverter section 112 that has already been described with reference to FIG. 14, the spatial resolution upconverter section 244 adjusts the image sizes of the R, G and B images to that of the high-spatial-resolution, high-temporal-resolution RGB image ($R_{OUT}$ $G_{OUT}B_{OUT}$) 102. However, as shown in FIG. 19, the input to the spatial resolution upconverter section 244 is a spatial frequency spectrum. That is why the spatial frequency spectrum should be converted into a luminance value by the luminance signal transforming section 246 and then supplied to the B and B interpolating and expanding sections 170 and 171.

The basic functions of the image data generator 200 can be performed perfectly only with the configuration shown in FIG. 17. If necessary, however, the functions of recording and playing image shots could be added, too.

With such an image data generator 200, an image of quality (i.e., with high spatial resolution and high temporal resolution) can be shot, recorded and played using a currently available three-panel camera as it is. In particular, since the spatial frequency spectrum that should be used to both distribute the ranges of respective color channels and perform the super-resolution processing is calculated in common, the overall size and weight of the device can be reduced and the cost can be cut down, too.

Embodiment 4

Hereinafter, an image data generator that can perform binning processing with the noise that has been caused due to a shortage of incoming light reduced while the ranges to be distributed to the respective channels are calculated will be described as fourth specific preferred embodiment of the present invention.

Figure 20:
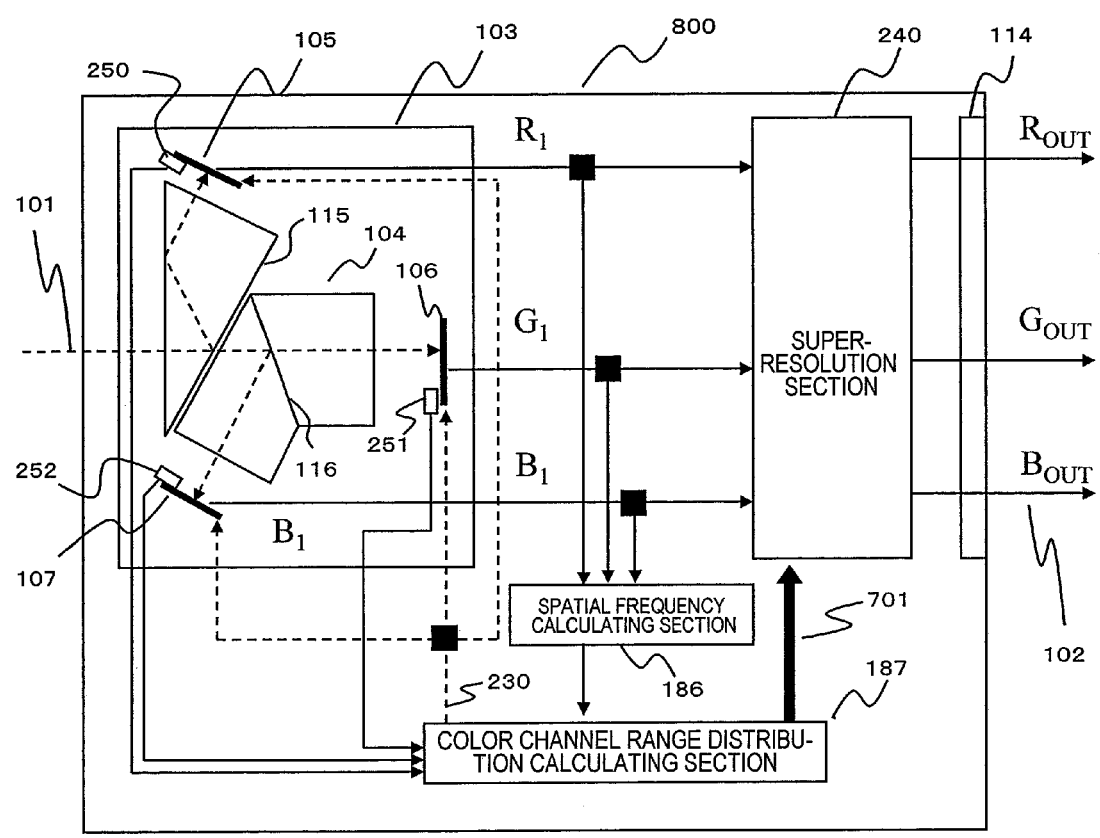
FIG. 20 is a block diagram illustrating a configuration for an image data generator 800 as a fourth specific preferred embodiment of the present invention.

FIG. 20 is a block diagram illustrating a configuration for an image data generator 800 as a fourth specific preferred embodiment of the present invention. In FIG. 20, any component also included in the image data generator 700 shown in FIG. 1 and having substantially the same function as its counterpart will be identified by the same reference numeral and the detailed description thereof will be omitted herein. The image data generator 800 includes the shooting section 103, the color separating section 104, the R imaging sensor section 105, the G imaging sensor section 106, the B imaging sensor section 107, a spatial frequency calculating section 186, a color channel range distribution calculating section 187, a super-resolution section 240, the output section 114, an R exposure meter 250, a G exposure meter 251 and a B exposure meter 252.

The R exposure meter 250 is attached to around the R imaging sensor section 105 to sense the surrounding part of the incoming light and measure the exposure dose of the R imaging sensor section 105. If the exposure dose were insufficient, noise would be produced to cause deterioration of image quality. That is why the exposure dose measured by the R exposure meter 250 is entered into the color channel range distribution section 187. And if the exposure dose is short of a predetermined reference value, the A/D converter section of the R imaging sensor section 105 is instructed to perform binning processing to smooth out and reduce the noise with a color channel range distribution signal 230. The same can be said about the G exposure meter 251 and the B exposure meter 252, too.

From the standpoint of spatial resolution, the binning processing corresponds to a resolution lowering process for lowering the spatial frequency. That is why the image data generator 800 will have details about the low resolution, i.e., a resolution lowering model, in itself. Generally speaking, the super-resolution processing is regarded as a reverse of the resolution lowering model. That is to say, if the processing to be carried out is an opposite type to the resolution lowering process, then the resolution should be able to be increased.

That is why in designing the super-resolution processing, it is important to understand the resolution lowering model. Stated otherwise, it is usually very difficult to design resolution raising process without clearly modeling the resolution lowering process. If the resolution lowering model is unknown, a common general-purpose model is often adopted provisionally and empirically. For example, smoothing with a Gaussian distribution may be adopted often. A technique for averaging multiple pixels, which is identical with the binning processing, could also be adopted empirically. In contrast, this preferred embodiment is characterized in that the details of the binning processing are updated with the incessantly changing exposure dose and that the resolution raising processing could be modified flexibly to catch up with the constantly changing resolution lowering model.

Also, since an exposure meter is provided for each color channel, the details of the binning processing are defined individually on a channel-by-channel basis. That is to say, it can be seen easily that the resolution lowering model changes from one color channel after another and that it is even more difficult to define it empirically.

As can be seen, by using the R, G and B exposure meters 250, 251 and 252, it can be estimated how much noise has been produced due to the shortage of light, and the binning processing can be adopted as a countermeasure for reducing the noise. In addition, the spatial frequency components that have been lost as a result of the binning processing can also be restored by the super-resolution processing. And all of these types of processing are under the control of the color channel range distribution calculating section 187. That is to say, the color channel range distribution calculating section 187 controls the binning processing so as to leave as high spatial frequency components as possible with the respective upper limits of the data transfer rates of the R, G and B imaging sensor sections 105, 106 and 107 and the noise that has been produced due to the shortage of light taken into consideration. At the same time, the color channel range distribution calculating section 187 supplies the binning processing detail signal 701 to the super-resolution section 240, thereby making the spatial resolution lowering model a known one and increasing the accuracy of estimating the spatial frequency components that have been lost as a result of the binning processing. Consequently, the upper limits of the data transfer rates of the R, G and B imaging sensor sections 105, 106 and 107 can be surpassed.

FIG. 21 shows the timings to operate the image data generator 800.

First, at a time t1, reading 710 is carried out to read the first pixel data from the R, G and B imaging sensor sections 105, 106 and 107. At this time, however, no spatial frequency analysis has been made yet, and therefore, no color channels can be subjected to the binning processing on an individual basis. That is why each color channel is subjected to 2×2 binning processing, thereby transferring data at the same rate over every color channel.

Next, at a time t2, reading 710 is carried on to read the second pixel data from the R, G and B imaging sensor sections 105, 106 and 107. At the same time, exposure dose sensing 801 is also carried out to measure the exposure doses of the first pixel data with the R, G and B exposure meters 250, 251 and 252.

Subsequently, at a time t3, while reading 710 and exposure dose sensing 801 are carried on, frequency analysis 711 is also carried out to make the spatial frequency calculating section 186 calculate the spatial frequency of the first pixel data.

Thereafter, at a time t4, while reading 710, exposure dose sensing 801 and the frequency analysis 711 are carried on, range distribution 712 and super-resolution processing 714 are newly started. The range distribution 712 is performed by the color channel range distribution calculating section 187. At this point in time t4, ranges are distributed to the respective color channels with respect to the first pixel. The super-resolution processing 714 is performed by the super-resolution section 240. At this point in time t4, the super-resolution processing is carried out on the first pixel.

Next, at a time t5, while reading 710, exposure dose sensing 801, frequency analysis 711, range distribution 712 and super-resolution processing 714 are carried on, binning processing 713 and image output 715 are newly started. The image output 715 is performed by the output section 114 so as to output the first pixel. On the other hand, the binning processing 713 is carried out by the R, G and B imaging sensor sections 105, 106 and 107 on the first pixel under the conditions that have been defined in accordance with the color channel range distribution signal 230 that has been supplied by the color channel range distribution calculating section 187. Since the binning processing becomes effective from the next time on, the binning processing is actually activated at the next time t6. The pixel data 802 that has been read (710) at the time t6 will go through frequency analysis 711, range distribution 712, super-resolution processing 714 and image output 715 with time t and then will be eventually output by the image data generator 800 at the time t10.

As can be seen from the foregoing description, if the time axis of the operating timing diagram shown in FIG. 21 is regarded as an operating clock signal for pipeline processing, there will be a time lag for five clock pulses after the image data has been read from the R, G and B imaging sensor sections 105, 106 and 107 and before their spatial frequency distribution is reflected on the binning processing. Also, there will be a time lag for four clock pulses after the image data generator 800 has been activated and before the first pixel data is output. After that, the same processing will be carried out on the respective color channels for five clock pulses that follow. And it is not until the sixth clock pulse is generated, or even later, that processing on respective color channels will be started. That is why the binning processing and the super-resolution processing on the respective color channels will get effective for the first time when the tenth clock pulse is generated. After that, every processing will be carried out on a clock pulse basis.

Embodiment 5

Figure 22:
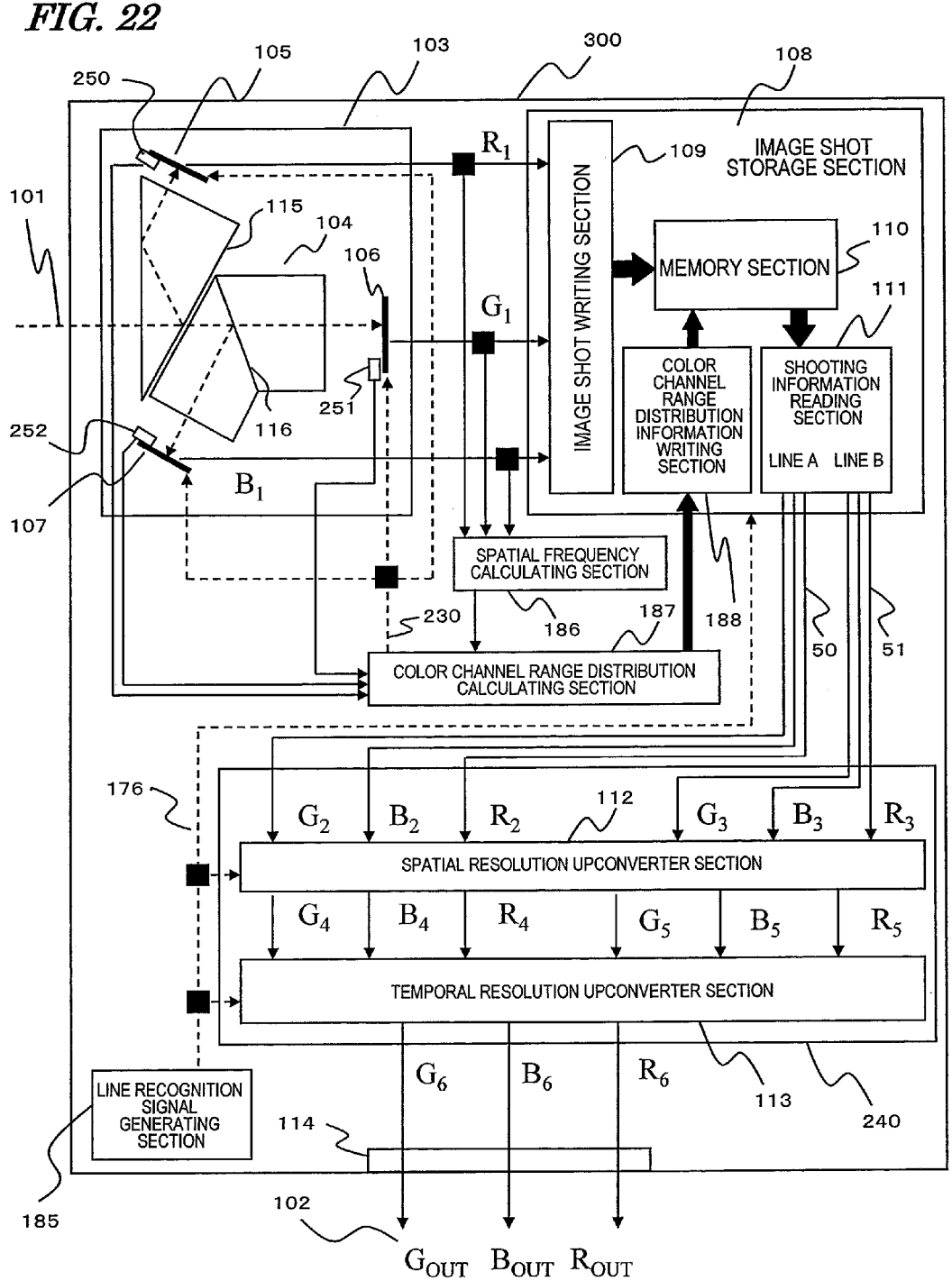
FIG. 22 is a block diagram illustrating a configuration for an image data generator 300 as a fifth specific preferred embodiment of the present invention.

FIG. 22 is a block diagram illustrating a configuration for an image data generator 300 as a fifth specific preferred embodiment of the present invention. In FIG. 22, any component also included in the image data generator 800 shown in FIG. 20 and having substantially the same function as its counterpart will be identified by the same reference numeral and the detailed description thereof will be omitted herein. The image data generator 300 includes the shooting section 103, the color separating section 104, the R imaging sensor section 105, the G imaging sensor section 106, the B imaging sensor section 107, the image shot storage section 108, the image shot writing section 109, the spatial frequency calculating section 186, the color channel range distribution calculating section 187, the color channel range distribution information writing section 188, the memory section 110, the shooting information reading section 111, the super-resolution section 240, the output section 114, the line recognition signal generating section 185, the R exposure meter 250, the G exposure meter 251 and the B exposure meter 252.

The color channel range distribution information writing section 188 writes the constantly changing details of the binning processing being performed by the color channel range distribution calculating section 187 on the memory section 110 sequentially. The shooting information reading section 111 reads the color channel range distribution information, as well as the image shot, and enters them into the super-resolution section 240, thereby updating the image feature quantity at the G image generating database section 140 sequentially.

In this preferred embodiment, the binning processing corresponds to a resolution lowering process itself, which means that the super-resolution processing, which is regarded as a reverse of the resolution lowering process, can be solved in a better condition. Generally speaking, as the resolution lowering model is unknown in many cases, a common general-purpose model is often adopted provisionally and empirically. For example, smoothing with a Gaussian distribution may be adopted often. A technique for averaging multiple pixels, which is identical with the binning processing, could also be adopted empirically. In contrast, this preferred embodiment is characterized in that the color channel range distribution calculating section 187 can update the details of the binning processing with the incessantly changing exposure dose and modify the resolution raising processing flexibly to catch up with the constantly changing resolution lowering model.

Also, since an exposure meter is provided for each color channel, the details of the binning processing are defined individually on a channel-by-channel basis. That is to say, it can be seen easily that the resolution lowering model changes from one color channel after another and that it is even more difficult to define it empirically.

With such an image data generator 300, an image of quality (i.e., with high spatial resolution and high temporal resolution) can be shot, recorded and played using a currently available three-panel camera as it is. In particular, the binning processing can be used to reduce the noise that has been produced due to the insufficient exposure. On top of that, the range that has become available as a result of the binning processing can be used for transferring the data of a high-spatial-resolution image.

Embodiment 6

Hereinafter, an image data generator that can raise the spatial resolution of a low-spatial-resolution, high-temporal-resolution image will be described as a sixth specific preferred embodiment of the present invention.

Figure 23:
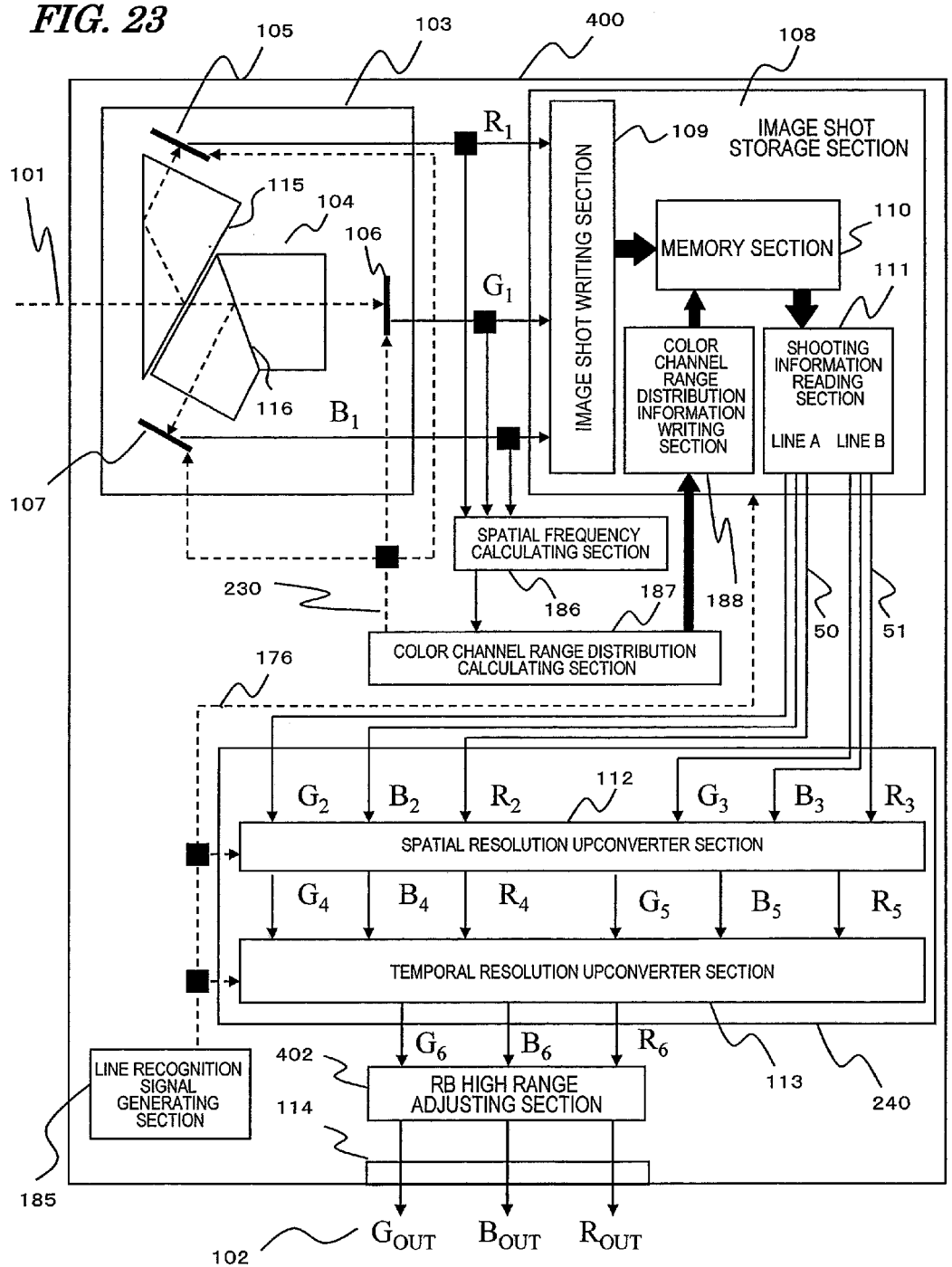
FIG. 23 is a block diagram illustrating a configuration for an image data generator 400 as a sixth specific preferred embodiment of the present invention.

FIG. 23 is a block diagram illustrating a configuration for an image data generator 400 as a sixth specific preferred embodiment of the present invention. In FIG. 23, any component also included in the image data generator 100 shown in FIG. 8 and having substantially the same function as its counterpart will be identified by the same reference numeral and the detailed description thereof will be omitted herein.

The image data generator 300 includes the shooting section 103, the color separating section 104, the R imaging sensor section 105, the G imaging sensor section 106, the B imaging sensor section 107, the image shot storage section 108, the image shot writing section 109, the spatial frequency calculating section 186, the color channel range distribution calculating section 187, the color channel range distribution information writing section 188, the memory section 110, the shooting information reading section 111, the super-resolution section 240, the output section 114, the line recognition signal generating section 185, and an RB high range adjusting section 402.

Figures 24, 25:
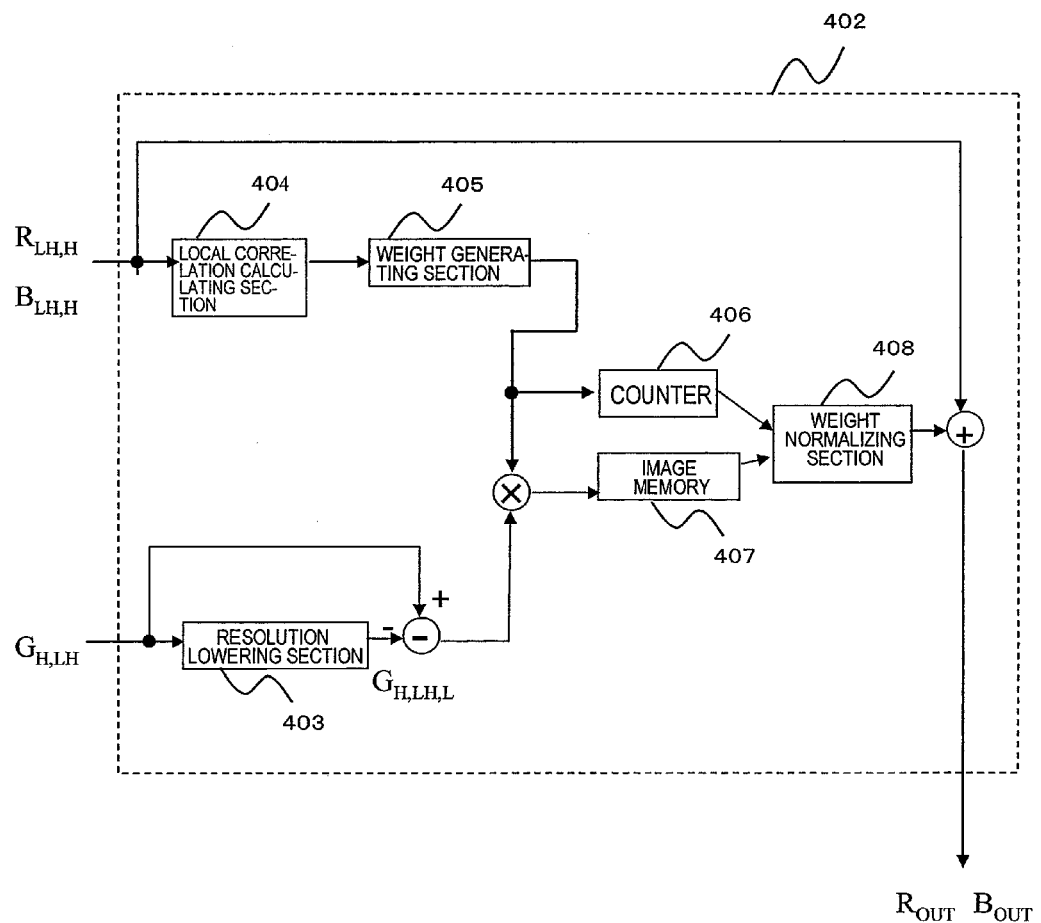
FIG. 24 is a block diagram illustrating an exemplary configuration for the RB high range adjusting section 402.
FIG. 25 illustrates examples of the contents of local ranges.

The RB high range adjusting section 402 superposes interpolated and expanded G high resolution components on the R and B images in accordance with their correlation, thereby raising the resolution of the R and B images. FIG. 24 illustrates an exemplary configuration for the RB high range adjusting section 402. As shown in FIG. 24, the RB high range adjusting section 402 includes a resolution lowering section 403, a local correlation calculating section 404, a weight generating section 405, a counter 406, an image memory 407, and a weight normalizing section 408.

The RB high range adjusting section 402 performs its processing on a frame-by-frame basis. First of all, at the beginning of the processing on each frame, the count of the counter 406 and the contents of the image memory 407 are reset or cleared into zero.

The resolution lowering section 403 decreases the spatial resolution of the G component $G_{HLH}$, of which the resolution has been raised by the temporal resolution upconverter section 113, thereby outputting $G_{H,LH,L}$. As described above, the image data generator of the present invention has a resolution lowering model in binning settings in itself, and therefore, ensures accurate resolution lowering processing. If the binning processing changes incessantly, however, the resolution lowering section 403 may be updated as needed. Then, the RB high range adjusting section 402 can operate dynamically.

$R_{LH,H}$ and $B_{LH,H}$ are R and B images that have been subjected to interpolation and expansion by the spatial resolution upconverter section 112 and have the same number of pixels and the same number of lines as $G_{HLH}$ that has been generated by the temporal resolution upconverter section 113.

The local correlation calculating section 404 calculates, in a local area consisting of 2×2 pixels shown in FIG. 25, for example, a value representing the correlation between $R_{LH,H}$ and $B_{LH,H}$ by the following Equation (6):

$$\rho = \frac{\sum_{i=1}^{4}(R_i - \overline{R})(B_i - \overline{B})}{\sqrt{\sum_{i=1}^{4}(R_i - \overline{R})}\sqrt{\sum_{i=1}^{4}(B_i - \overline{B})}} \quad \text{Equation (6)}$$

It should be noted that the local correlation between R and B does not have to be calculated in such a narrow area consisting of just 2×2 pixels. Alternatively, the correlation could also be calculated in a broader square area consisting of 3×3 pixels, 4×4 pixels or 5×5 pixels or in a circular area or a quadrangular or any other polygonal area. Still alternatively, the correlation could also be calculated with a weight added to a pixel of interest and its surrounding area using a Gaussian function, for example.

Figure 26:
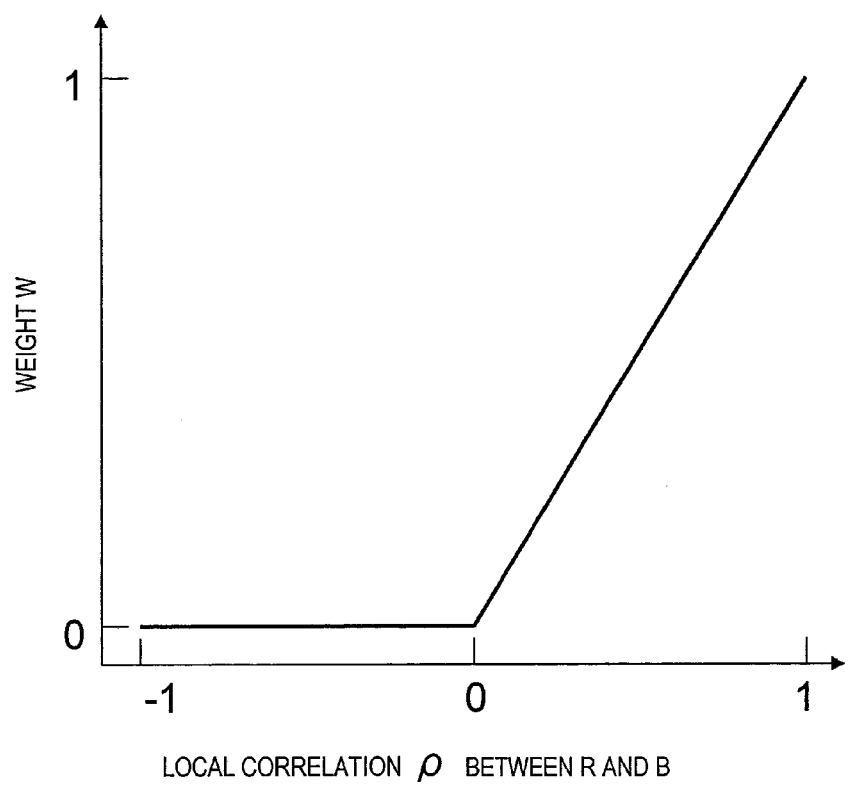
FIG. 26 shows how the weight W changes with a local correlation ρ between R and B.

The weight generating section 405 generates a weight according to the correlation value that has been calculated by the local correlation calculating section 404. The relation between the correlation value and the weight may be defined as shown in FIG. 26 such that the higher the degree of positive correlation, the greater the weight W and the bigger the difference between $G_{HH}$ and $G_{LH}$ (i.e., the high resolution components of G) to be superposed. On the other hand, if there is negative correlation, the difference between $G_{HH}$ and $G_{LH}$ (i.e., the high resolution components of G) will not be superposed but the weight W will be zero. The difference between $G_{HH}$ and $G_{LH}$ (i.e., the high resolution components of G) multiplied by the weight W is added to an address at the image memory 407 associated with the pixel location. In this case, the writing range in the image memory 407 may be either a single pixel or a range where the local correlation value has been calculated. If the high resolution components are superposed with respect to multiple pixels as in the latter case, multiple high-range waveforms could be superposed one upon the other on the same pixel depending on how to define a range where the local correlation should be calculated (i.e., how to make an increment in the image). That is why in this preferred embodiment, the number of times the high-range waveforms are superposed one upon the other is counted by the counter 406 and stored for each pixel.

The normalizing section 408 divides the high-range waveforms that have been superposed one upon the other a number of times by the value representing the number of times of write as stored in the counter 406 for each pixel. The normalized high-range signal is superposed on $R_{LH,H}$ and $B_{LH,H}$ and output as $R_{OUT}$, $B_{OUT}$.

With such an apparatus 400 for shooting, recording and playback, an image of quality (i.e., with high spatial resolution and high temporal resolution) can be shot, recorded and played using a currently available three-panel camera as it is. Among other things, by increasing the resolutions of R and B, the resolution of R and B can be raised with a local color balance maintained. As a result, the resolution can be increased with the production of pseudo-colors minimized.

Embodiment 7

Figure 27A:
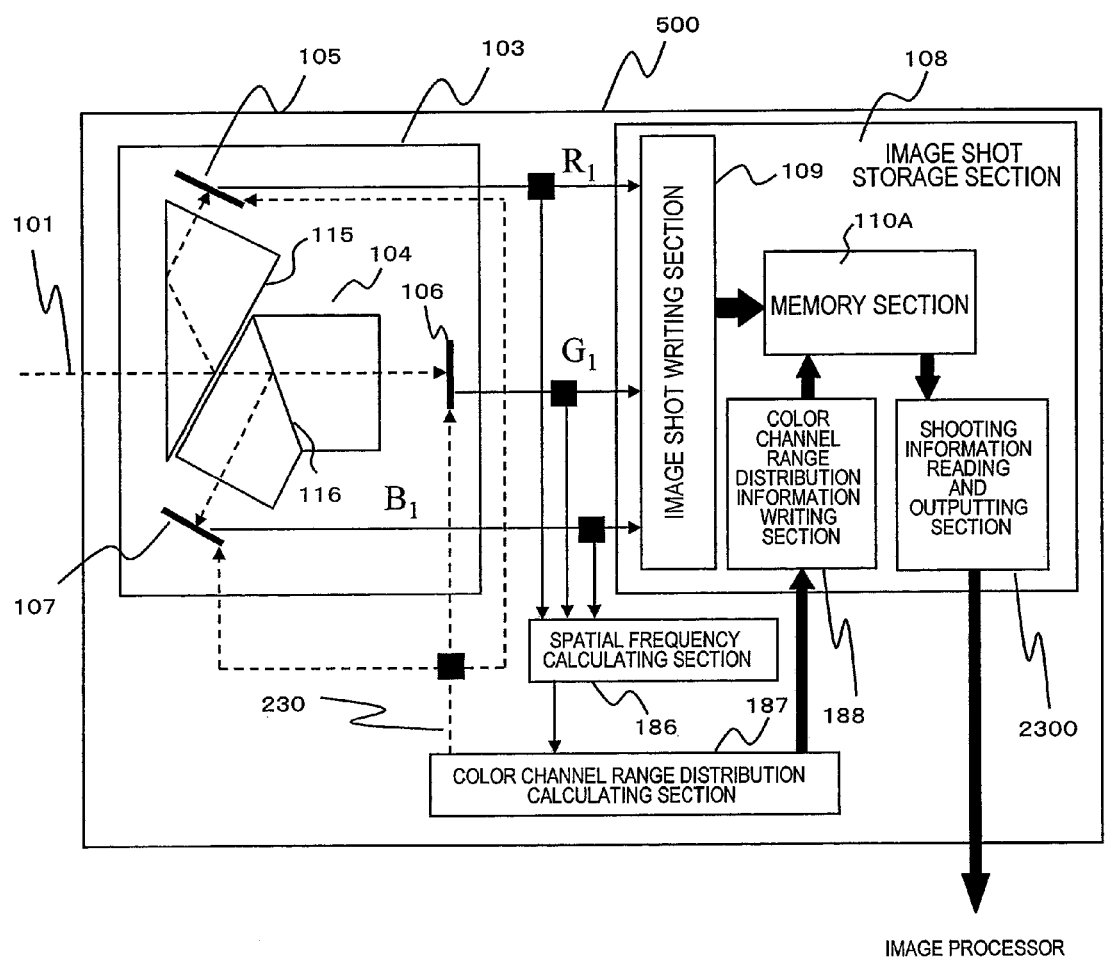
FIG. 27A is a block diagram illustrating a configuration for an image capture device according to a seventh specific preferred embodiment of the present invention.
Figure 27B:
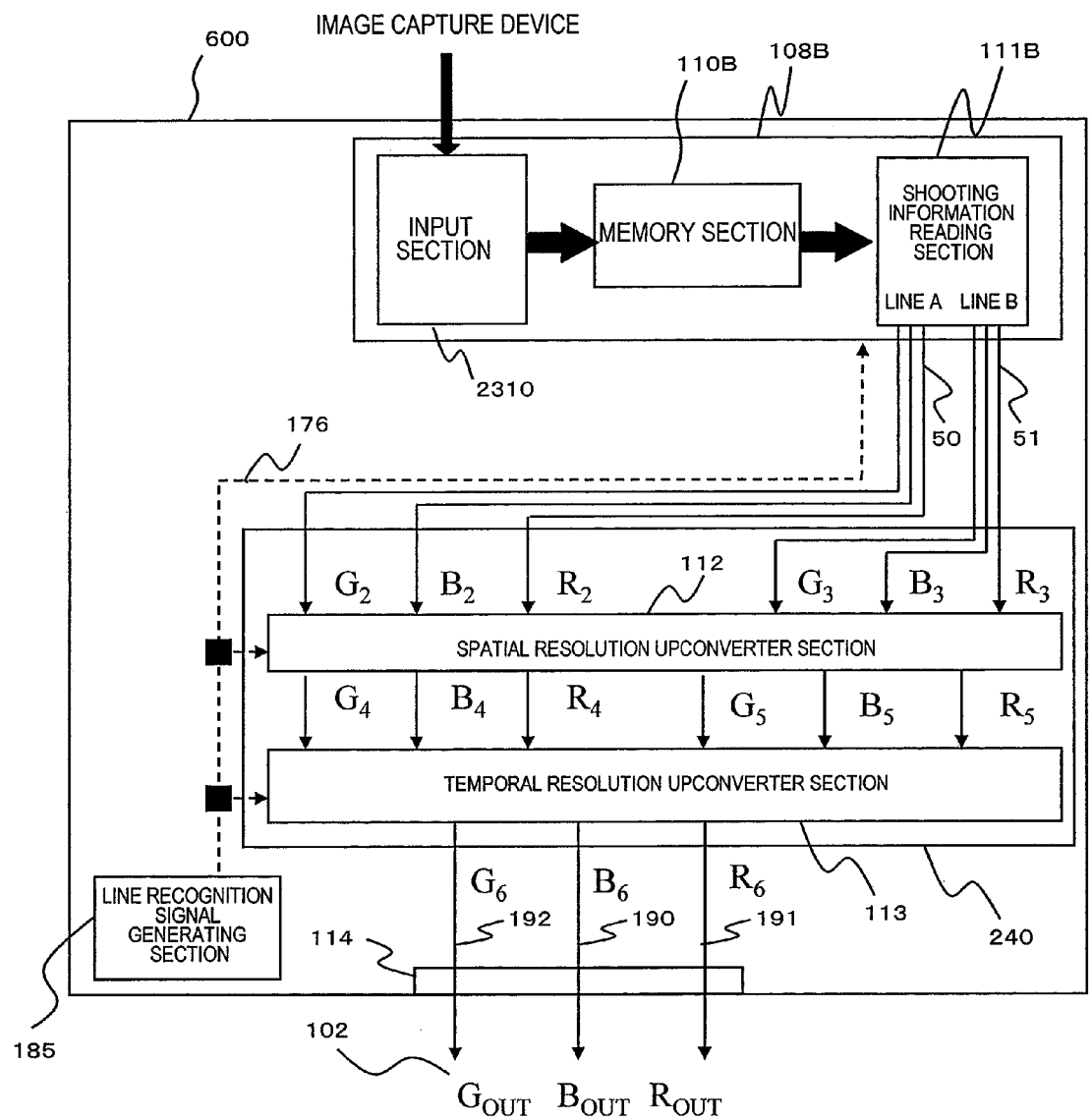
FIG. 27B is a block diagram illustrating a configuration for an image processor according to the seventh preferred embodiment of the present invention.
Figure 29:
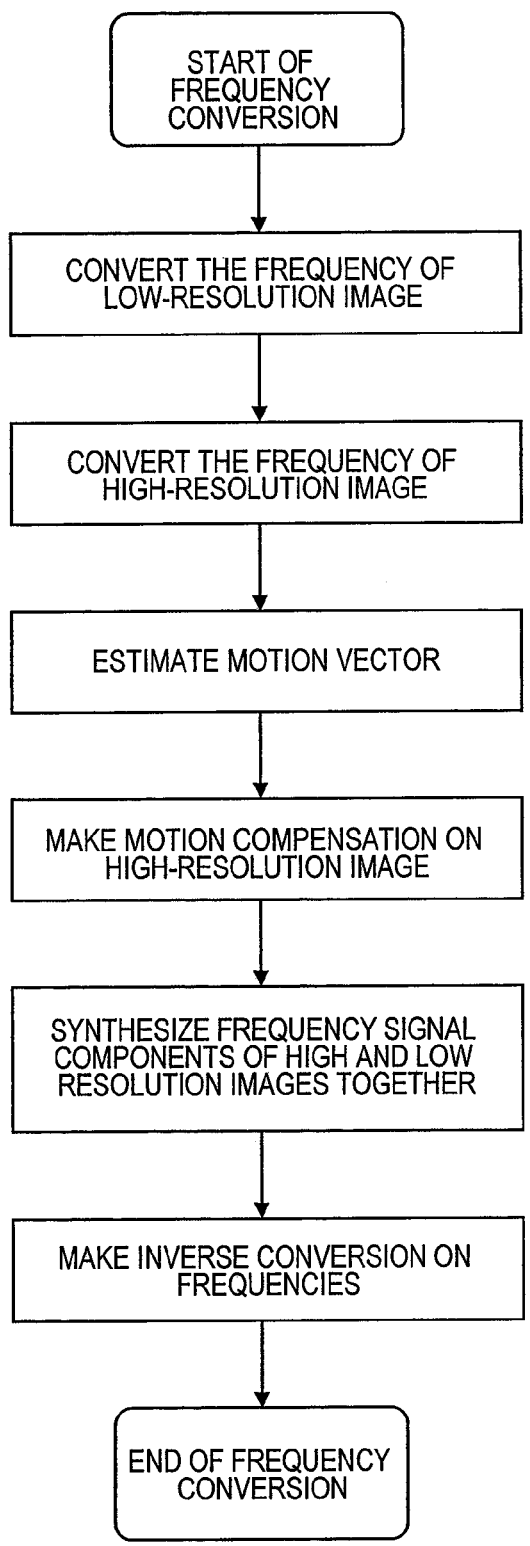
FIG. 29 is a flowchart showing the procedure of generating the image data 3.
Figure 30:
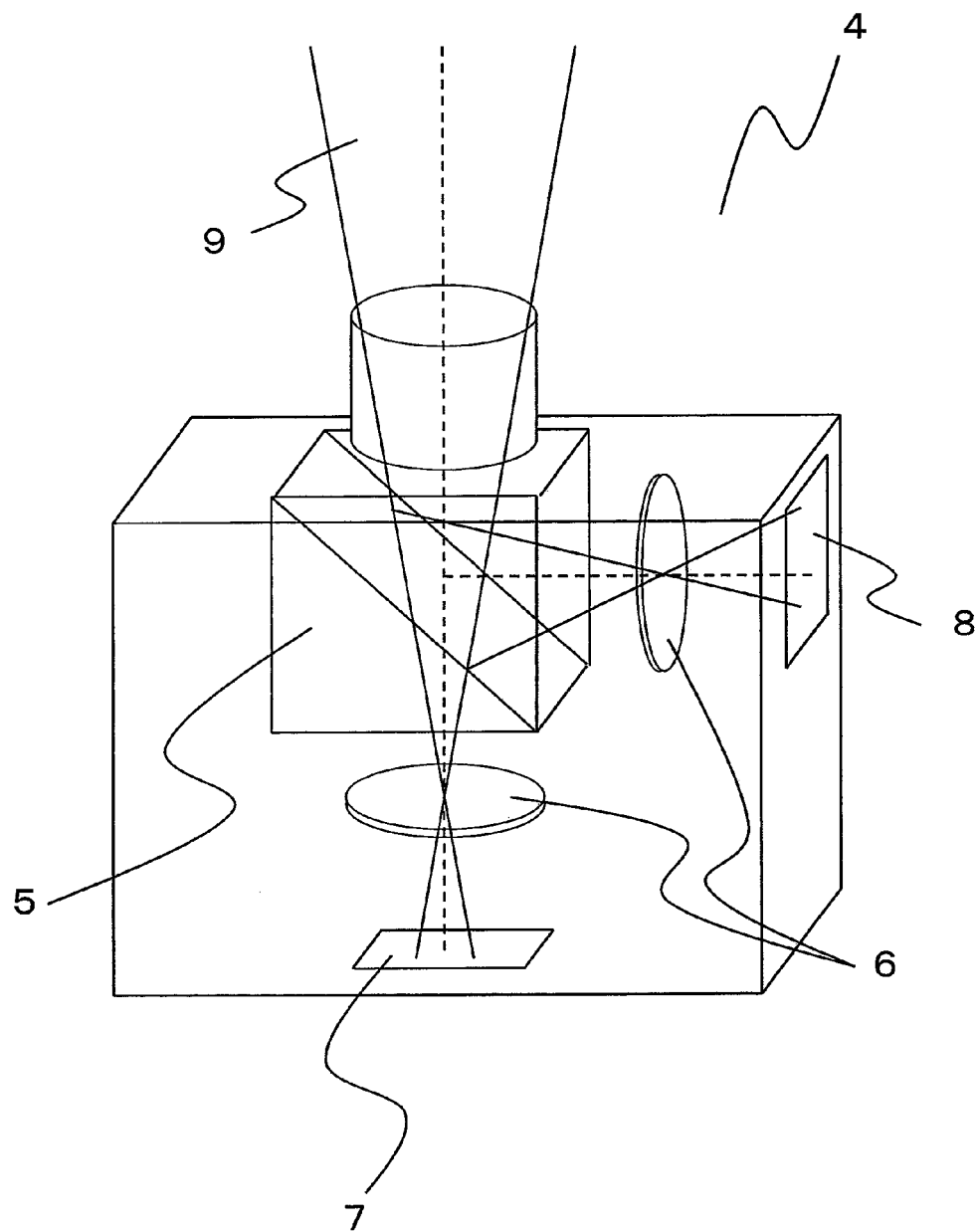
FIG. 30 illustrates an exemplary configuration for a composite sensor camera to acquire the image data 1 and 2.

FIG. 27A is a block diagram illustrating a preferred embodiment of an image capture device according to the present invention, while FIG. 27B is a block diagram illustrating a preferred embodiment of an image processor according to the present invention.

Just like the image data generator 100 shown in FIG. 8, the image capture device 500 shown in FIG. 27A includes the shooting section 103, the color separating section 104, the R imaging sensor section 105, the G imaging sensor section 106, the B imaging sensor section 107, the image shot storage section 108, the image shot writing section 109, the spatial frequency calculating section 186, the color channel range distribution calculating section 187, and the color channel range distribution information writing section 188.

However, the image capture device 500 does not include the super-resolution section 240 and the image shot storage section 108 includes a memory section 110A and a shooting information reading and outputting section 2300 for outputting the data that has been read from the memory section 110A to an external device, unlike the image data generator 100 (see FIG. 8) of the second preferred embodiment described above.

The image capture device 500 operates in the same way as the device of the first preferred embodiment described above until the data of an image shot gets stored in the memory section 110A, and the description thereof will be omitted herein.

In this preferred embodiment, the shooting information reading and output section 2300 can send the data that is stored in the memory section 110A to the image processor shown in FIG. 27B over a telecommunications line or a phone line, for example. In this case, as information for use to restore the spatial frequency components that have been lost as a result of the binning processing, information about the settings of the binning processing (such as information about the data transfer rate of each color channel) should be transmitted to the image processor.

The image processor 600 shown in FIG. 27B includes everything that the image data generator 100 of the second preferred embodiment has (see FIG. 8) except the shooting section 103 and the image shot writing section 109. This image processor 600 includes an input section 2310 that receives the data supplied from the image capture device 500 shown in FIG. 27A. The input section 2310 can write that data on a memory section 110B. The data that has been written on the memory section 110B is read by a shooting information reading section 111B. The data reading process is performed by the shooting information reading section 111B in the same way as what has already been described for the image data generator 100 of the second preferred embodiment.

Data is transferred between the image capture device 500 shown in FIG. 27A and the image processor 600 shown in FIG. 27B either over a line or wirelessly. Or such a data transfer could also be carried out via a removable memory. For example, if part or all of the memory section 110A shown in FIG. 27A is implemented as a removable memory (such as a memory card), then the shooting information can be transferred from the image capture device 500 to the image processor 600 by attaching the removable memory to the image processor 600 as the memory section 110B shown in FIG. 27B or at least a part of it. In the removable memory, information about the settings of the binning processing can also be stored as information for use to restore the spatial frequency components that have been lost as a result of the binning processing.

As can be seen, in this preferred embodiment, the section that performs the shooting processing (i.e., a camera) and the section that performs the super-resolution processing are not integrated together but can perform their required processing and operations as two separate devices. As a result, the size and weight of the image capture device can be reduced. Optionally, the functions of the image processor 600 could also be performed by installing a program that carries out any desired algorithm into a general-purpose computer such as a personal computer. Furthermore, the image processor 600 of this preferred embodiment can also be built in effectively in a recorder that can store images on a hard disk drive (HDD) or an optical disc or an image display device such as a TV set with a flat display panel.

In the preferred embodiments of the present invention described above, the "spatial frequency" could be replaced with a "temporal frequency" if the domain where the frequency is supposed to be calculated is changed from space into time. In calculating a spatial frequency, multiple pixel data are stored in a memory and a difference in luminance between spatially adjacent or neighboring pixels is calculated. To calculate a temporal frequency, on the other hand, the image data of multiple frames are stored in a memory and a difference in luminance between temporally continuous or at least proximate pixels needs to be calculated.

It should be noted that the respective components of the preferred embodiments of the present invention described above could be implemented as hardware components or with a software program. For example, at least a part of the image data generating processing could be implemented as a computer-readable program or carried out by some components of a computer itself.

INDUSTRIAL APPLICABILITY

As can be seen from the foregoing description, the present invention is applicable effectively to any type of video device such as a video movie camera, a TV set, or a digital still camera with a moving picture shooting function. The present invention can be used in widely popular personal computers, too.

The invention claimed is:

1. An image data generator comprising:
    a light splitting section for splitting incoming light into a number of wavelength ranges;
    an imager section including a plurality of image capturing sections, in each of which arranged are multiple photoelectric transducer units, each outputting an analog signal representing the incoming light, wherein the image capturing sections receive and capture the incoming light, which has been split into those wavelength ranges by the light splitting section, thereby outputting the analog signals on a wavelength range basis;
    an A/D converter section having the function of adding together the analog signals that have been output by the photoelectric transducer units, the A/D converter section converting either each of the analog signals supplied from the photoelectric transducer units or the sum thereof into a digital signal;
    a spatial frequency calculating section for generating frequency spectrum distribution data of the digital signal;
    a range distribution calculating section having the ability to specify a number of photoelectric transducer units, of which the output analog signals are to be added together by the A/D converter section, on a wavelength range basis by reference to the frequency spectrum distribution data; and
    a super-resolution section for increasing high-frequency components of the frequency spectrum distribution data of the digital signal that has been supplied from the A/D converter section.

2. The image data generator of claim 1, wherein the super-resolution section restores at least a part of the high-frequency components of the frequency spectrum distribution data, which have been lost as a result of the addition of the analog signals by the A/D converter section.

3. The image data generator of claim 1, wherein the light splitting section separates the incoming light that has come from a subject into red, green and blue light beams, and
    wherein the imager section receives the red, green and blue light beams and outputs, R, G and B images, and
    wherein the A/D converter section adds together the analog signals supplied from the imager section such that a sum of data transfer rates of the R, G, and B images becomes equal to a predetermined value, and
    wherein the range distribution calculating section calculates frequency spectrum energies in predetermined frequency ranges with respect to the R, G and B images and defines the ratio of inverse ones of the respective numbers of analog signals that have been added together by the A/D converter section to be a ratio of the frequency spectrum energies of the R, G and B images.

4. The image data generator of claim 1, wherein the range distribution calculating section enters a method for adding the analog signals in the A/D converter section into the super-resolution section so that the method is used to perform a resolution lowering process.

5. The image data generator of claim 1, wherein the super-resolution section acquires a low-spatial-resolution, high-temporal-resolution image and a high-spatial-resolution, low-temporal-resolution image, which have been generated by the A/D converter section, according to the wavelength range that has been specified by the range distribution calculating section, and wherein the super-resolution section converts the temporal resolution of the high-spatial-resolution, low-temporal-resolution image into that of the low-spatial-resolution, high-temporal-resolution image based on a correspondence between a low-spatial-resolution image and a high-spatial-resolution image, thereby generating a high-spatial-resolution, high-temporal-resolution image.

6. The image data generator of claim 1, wherein the imager section includes an exposure measuring section for measuring the intensity of the light that has been split, and
wherein the A/D converter section adds together the analog signals such that the intensity of the light measured reaches a predetermined value.

7. An image data generating method comprising the steps of:
splitting light that has come from a subject using a light splitting section;
receiving the split light and outputting analog signals using an imager section;
providing the option of adding those analog signals together and converting either the sum of the analog signals or each said analog signal that has not been added together into a digital signal;
specifying a number of the analog signals to be added together on a wavelength range basis using a range distribution calculating section according to the magnitude of energy of the frequency spectrum of the digital signal generated by a spatial frequency calculating section; and
restoring at least a part of frequency components that have been lost as a result of the addition of the analog signals using a super-resolution section.

8. A program stored on a non-transitory computer readable storage medium to get image data generating processing carried out by an image data generator with an image capturing section,
wherein the image data generating processing is defined to make the image data generator perform the steps of:
making the image capturing section receive split light that has come from a subject and output analog signals;
converting either the sum of the analog signals or each said analog signal that has not been added together into a digital signal;
specifying a number of the analog signals to be added together on a wavelength range basis according to the magnitude of energy of the frequency spectrum of the digital signal; and
restoring at least a part of frequency components that have been lost as a result of the addition of the analog signals.

9. An image capture device comprising:
a light splitting section for splitting incoming light into a number of wavelength ranges;
an imager section including a plurality of image capturing sections, in each of which arranged are multiple photoelectric transducer units, each outputting an analog signal representing the incoming light, wherein the image capturing sections receive and capture the incoming light, which has been split into those wavelength ranges by the light splitting section, thereby outputting the analog signals on a wavelength range basis;
an A/D converter section having the function of adding together the analog signals that have been output by the photoelectric transducer units, the A/D converter section converting either each of the analog signals supplied from the photoelectric transducer units or the sum thereof into a digital signal;
a spatial frequency calculating section for generating frequency spectrum distribution data of the digital signal;
a range distribution calculating section having the ability to specify a number of photoelectric transducer units, of which the output analog signals are to be added together by the A/D converter section, on a wavelength range basis by reference to the frequency spectrum distribution data.

10. An image processor comprising an input section that receives the digital signal that has been generated by the image capture device of claim 9 and binning processing information indicating the number of the photoelectric transducer units, of which the output analog signals have been added together by the A/D converter section,
wherein the super-resolution section restores at least a part of the high-frequency components of the frequency spectrum distribution data, which have been lost as a result of the addition of the analog signals by the A/D converter section.

11. The image processor of claim 10, wherein the input section has a structure to be loaded with a storage medium on which the digital signal and the binning processing information are stored.

* * * * *